(12) United States Patent
Li

(10) Patent No.: US 10,608,778 B2
(45) Date of Patent: Mar. 31, 2020

(54) DATA TRANSMISSION METHOD AND TERMINAL

(71) Applicant: TENDYRON CORPORATION, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 0 days.

(21) Appl. No.: 16/463,819

(22) PCT Filed: Oct. 25, 2017

(86) PCT No.: PCT/CN2017/107597
§ 371 (c)(1),
(2) Date: May 23, 2019

(87) PCT Pub. No.: WO2018/095179
PCT Pub. Date: May 31, 2018

(65) Prior Publication Data
US 2020/0076529 A1    Mar. 5, 2020

(30) Foreign Application Priority Data

Nov. 24, 2016  (CN) .......................... 2016 1 1051741
Nov. 24, 2016  (CN) .......................... 2016 1 1053484

(51) Int. Cl.
*H04L 1/00* (2006.01)
*H04L 1/18* (2006.01)
(52) U.S. Cl.
CPC .......... *H04L 1/0002* (2013.01); *H04L 1/0007* (2013.01); *H04L 1/1864* (2013.01)

(58) Field of Classification Search
None
See application file for complete search history.

(56) References Cited

U.S. PATENT DOCUMENTS 3,956,589 A * 5/1976 Weathers .............. H04L 1/1671
                                        370/296
4,315,251 A * 2/1982 Robinson ................. H04Q 9/14
                                        340/4.21

(Continued)

FOREIGN PATENT DOCUMENTS

| CN | 101662448 A | 3/2010 |
| CN | 102739320 A | 10/2012 |
| CN | 104714920 A | 6/2015 |

OTHER PUBLICATIONS

International Patent Application No. PCT/CN2017/107597; Int'l Search Report; dated Jan. 25, 2018; 2 pages.

*Primary Examiner* — Andrew C Oh
(74) *Attorney, Agent, or Firm* — BakerHostetler

(57) ABSTRACT

Provided by the present invention are a data transmission method and a terminal, and the method comprises: acquiring data to be sent comprising N data frames; acquiring a bit sequence of an $i^{th}$ data frame; sending X waveform sequences corresponding to bits in the bit sequence of the $i^{th}$ data frame; detecting a level change of a receiving port after completion of sending the X waveform sequences; determining Y waveform sequences of received data; determining a bit sequence of the received data; acquiring a bit sequence of an $(i+1)^{th}$ data frame when the bit sequence at least comprises a flag bit for at least indicating success of receiving data; sending Z waveform sequences corresponding to bits in the bit sequence of the $(i+1)^{th}$ data frame until all the N data frames of the data to be sent are sent.

20 Claims, 6 Drawing Sheets

(56) References Cited

U.S. PATENT DOCUMENTS

| | | | | |
|---|---|---|---|---|
| 4,379,340 A * | 4/1983 | Holtey | G06F 13/385 | 340/3.55 |
| 4,568,161 A * | 2/1986 | DiGianfilippo | G03B 23/00 | 353/25 |
| 5,150,408 A * | 9/1992 | Bright | H04L 9/0891 | 380/273 |
| 5,270,480 A * | 12/1993 | Hikawa | A63H 13/00 | 446/298 |
| 5,390,351 A * | 2/1995 | Di Giulio | G05B 19/0421 | 709/225 |
| 5,418,785 A * | 5/1995 | Olshansky | H04J 14/0227 | 370/438 |
| 6,636,922 B1 * | 10/2003 | Bastiani | G06F 13/4291 | 709/250 |
| 8,085,893 B2 * | 12/2011 | Werner | H03D 13/004 | 375/327 |
| 2002/0059479 A1 * | 5/2002 | Hardy | G06F 13/385 | 710/1 |
| 2003/0078006 A1 * | 4/2003 | Mahany | G06F 1/163 | 455/63.1 |
| 2005/0189908 A1 * | 9/2005 | Guthrie | G06F 1/263 | 320/107 |
| 2006/0029006 A1 | 2/2006 | Oster | | |
| 2006/0212679 A1 * | 9/2006 | Alfano | G06F 1/08 | 712/38 |
| 2010/0246734 A1 * | 9/2010 | Tamura | H04L 7/0331 | 375/345 |
| 2014/0201414 A1 * | 7/2014 | Keegan | G06F 13/4081 | 710/303 |
| 2015/0029844 A1 * | 1/2015 | Pathmasuntharam | H04W 28/22 | 370/230 |
| 2015/0142945 A1 * | 5/2015 | Brandt | H04L 29/06027 | 709/223 |
| 2016/0311094 A1 * | 10/2016 | Mergener | B25F 5/00 | |
| 2016/0350193 A1 * | 12/2016 | Katou | G06F 11/2097 | |

* cited by examiner

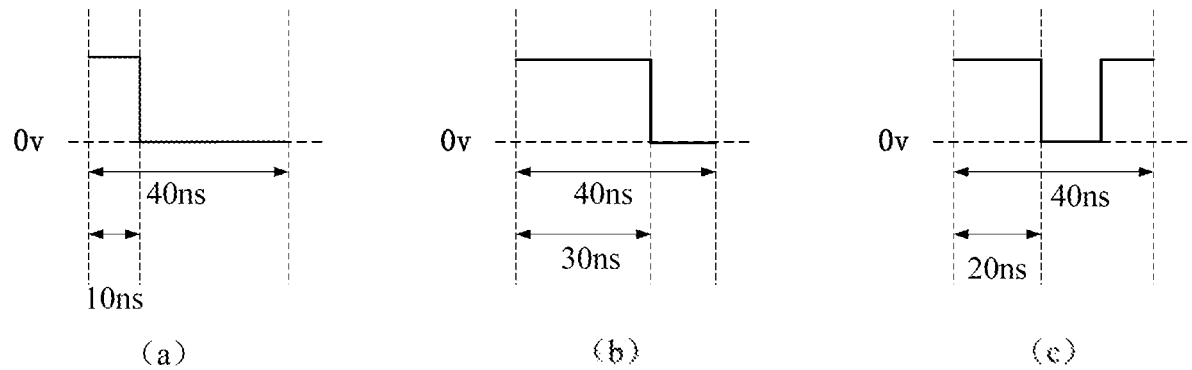
Fig. 2
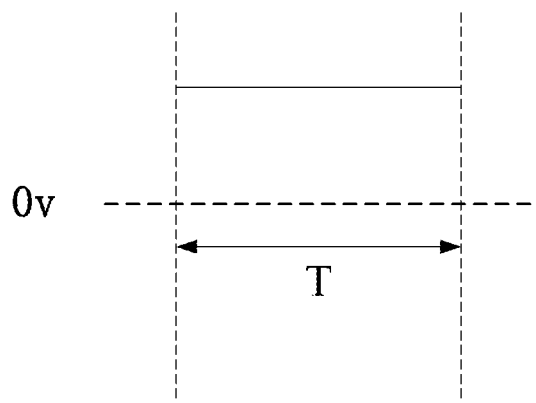
Fig. 3
Fig. 4
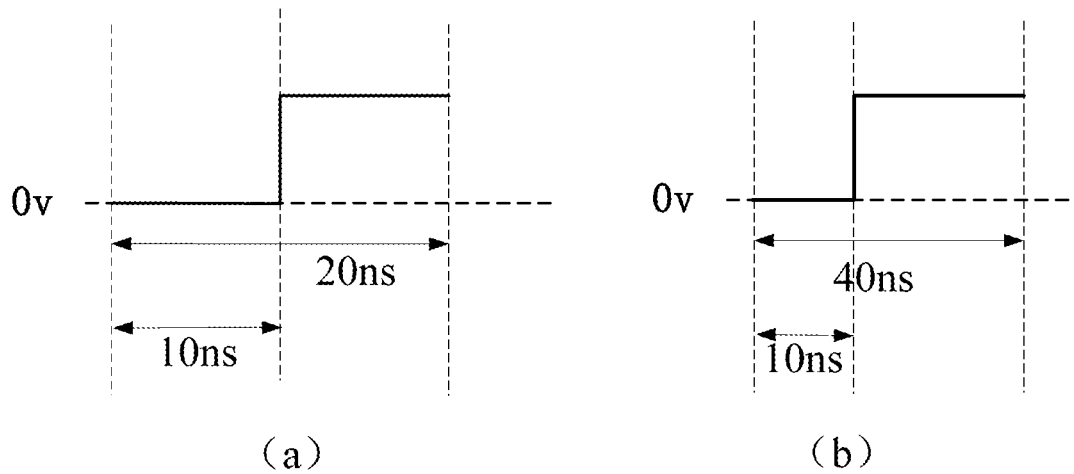
Fig. 5

DATA TRANSMISSION METHOD AND TERMINAL

CROSS-REFERENCE TO RELATED APPLICATION

This application is a U.S. national phase application of International Application No. PCT/CN2017/107597, filed on Oct. 25, 2017, which claims priority to Chinese Patent Application No. 201611053484.1, filed on Nov. 24, 2016 and Chinese Patent Application No. 201611051741.8, filed on Nov. 24, 2016, the entire contents of which are incorporated herein by reference.

TECHNICAL FIELD

The present disclosure relates to a field of electronic technology, and particular to a data transmission method and a terminal.

BACKGROUND

In existing signal transmission technologies, different time intervals are normally adopted to distinguish different bit values from each other. For example, bit 00 is represented by T+t1, bit 01 is represented by T+t2, bit 10 is represented by T+t3 and bit 11 is represented by T+t4. With the existing signal transmission technologies, the time required to transmit different bit values is long, the coding efficiency for data bits is low and burdens as well as costs on sending and receiving terminals are raised.

In addition, in the prior art, in a data transmission process, usually only when the sending terminal finishes sending all the data packets will it receive a retransmission request from the receiving terminal, the sending terminal will then retransmit all the data or the data packets that the receiving terminal fails to receive, both of which will cause a lowered data retransmission efficiency and an increased data transmission amount.

SUMMARY

The present disclosure aims at solving at least one of the above problems.

A substantial objective of the present disclosure is to provide a data transmission method.

Another objective of the present disclosure is to provide a terminal.

In order to achieve the above objectives, technical solutions of the present disclosure are realized as follows.

According to an aspect of the present disclosure, a data transmission method is provided, including: acquiring data to be sent, the data to be sent comprising N data frames; acquiring a bit sequence of an $i^{th}$ data frame, a value of i being 1, 2, 3 . . . N sequentially, and N being a positive integer; continuously sending X waveform sequences corresponding to bits in the bit sequence of the $i^{th}$ data frame according to the bit sequence of the $i^{th}$ data frame; wherein X is a positive integer, a waveform sequence comprises one of a first waveform sequence, a second waveform sequence and a third waveform sequence, and characteristics of the waveform sequences comprise that: the first waveform sequence, the second waveform sequence and the third waveform sequence have an identical transmission duration, the transmission duration is inversely proportional to a baud rate of the waveform sequence, the first waveform sequence starts with a high level and has a low level presented within the transmission duration, in which a total duration of the low level presented in the first waveform sequence does not change with a change of the baud rate of the waveform sequence, the second waveform sequence maintains a high level within the transmission duration, the third waveform sequence starts with a low level and ends with a high level, in which a total duration of the low level presented in the third waveform sequence does not change with a change of the baud rate of the waveform sequence, and each waveform sequence of the X waveform sequences independently is one of the first waveform sequence, the second waveform sequence and the third waveform sequence; detecting a level change of a receiving port after completion of sending the X waveform sequences corresponding to the bit sequence of the $i^{th}$ data frame; determining Y waveform sequences of received data according to the level change and characteristics of the waveform sequences, Y being a positive integer, and each waveform sequence of the Y waveform sequences independently being one of the first waveform sequence, the second waveform sequence and the third waveform sequence; determining a bit sequence of the received data according to the Y waveform sequences of the received data; acquiring a bit sequence of an $(i+1)^{th}$ data frame when the bit sequence of the received data at least comprises a flag bit for at least indicating success of receiving data; continuously sending Z waveform sequences corresponding to bits in the bit sequence of the $(i+1)^{th}$ data frame according to the bit sequence of the $(i+1)^{th}$ data frame until all the N data frames of the data to be sent are sent, Z being a positive integer, and each waveform sequence of the Z waveform sequences independently being one of the first waveform sequence, the second waveform sequence and the third waveform sequence; wherein during sending the N data frames of the data to be sent, the first waveform sequence represents a first data bit being one of bit 1 or bit 0, and the second waveform sequence and the third waveform sequence represent a second data bit being the other one of bit 1 and bit 0, respectively; when at least two bits sent in a consecutive manner are the second data bits, a waveform sequence corresponding to a first bit of the at least two bits sent in a consecutive manner is the second waveform sequence, and waveform sequences corresponding to a second bit and subsequent bits are the third waveform sequences.

According to another aspect of the present disclosure, a terminal is provided, including: a bit sequence acquiring module, a waveform sequence generating and sending module, a level detecting module and a data determining module, wherein: the bit sequence acquiring module is configured to acquire data to be sent, the data to be sent comprising N data frames; to acquire a bit sequence of an $i^{th}$ data frame, a value of i being 1, 2, 3 . . . N sequentially, and N being a positive integer; the waveform sequence generating and sending module is configured to continuously send X waveform sequences corresponding to bits in the bit sequence of the $i^{th}$ data frame according to the bit sequence of the $i^{th}$ data frame, wherein X is a positive integer, a waveform sequence comprises one of a first waveform sequence, a second waveform sequence and a third waveform sequence, and characteristics of the waveform sequences comprise that: the first waveform sequence, the second waveform sequence and the third waveform sequence have an identical transmission duration, the first waveform sequence starts with a high level and has a low level presented within the transmission duration, in which a total duration of the low level presented in the first waveform sequence does not change with a change of the baud rate of the waveform sequence, the second waveform sequence maintains a high level within the transmission duration, the third waveform sequence starts with a low level and ends with a high level, in which a total duration of the low level presented in the third waveform sequence does not change with a change of the baud rate of the waveform sequence, and each waveform sequence of the X waveform sequences independently is one of the first waveform sequence, the second waveform sequence and the third waveform sequence; the level detecting module is configured to detect a level change of a receiving port after the X waveform sequences corresponding to the bit sequence of the $i^{th}$ data frame are sent completely by the waveform sequence generating and sending module; the data determining module is configured to determine Y waveform sequences of received data according to the level change and characteristics of the waveform sequences. Y being a positive integer, and each waveform sequence of the Y waveform sequences independently being one of the first waveform sequence, the second waveform sequence and the third waveform sequence; determine a bit sequence of the received data according to the Y waveform sequences of the received data; and trigger the bit sequence acquiring module to acquire a bit sequence of an $(i+1)^{th}$ data frame when the bit sequence of the received data at least comprises a flag bit for at least indicating success of receiving data; the bit sequence acquiring module is further configured to acquire the bit sequence of the $(i+1)^{th}$ data frame when being triggered by the data determining module; the waveform sequence generating and sending module is further configured to continuously send Z waveform sequences corresponding to bits in the bit sequence of the $(i+1)^{th}$ data frame according to the bit sequence of the $(i+1)^{th}$ data frame until all the N data frames of the data to be sent are sent, Z being a positive integer, and each waveform sequence of the Z waveform sequences independently being one of the first waveform sequence, the second waveform sequence and the third waveform sequence; wherein, when the N data frames of the data to be sent are sent by the waveform sequence generating and sending module, the first waveform sequence represents a first data bit being one of bit 1 or bit 0, and the second waveform sequence and the third waveform sequence represent a second data bit being the other one of bit 1 and bit 0, respectively; when at least two bits sent in a consecutive manner are the second data bits, a waveform sequence corresponding to a first bit of the at least two bits sent in a consecutive manner is the second waveform sequence, and waveform sequences corresponding to a second bit and subsequent bits are the third waveform sequences.

According to an aspect of the present disclosure, a data transmission method is provided, including: detecting a level change of a receiving port;

determining waveform sequences transmitted in a consecutive manner according to the level change and characteristics of the waveform sequences, wherein a waveform sequence comprises one of a first waveform sequence, a second waveform sequence and a third waveform sequence, and characteristics of the waveform sequences comprise that: the first waveform sequence, the second waveform sequence and the third waveform sequence have an identical transmission duration, the transmission duration is inversely proportional to a baud rate of the waveform sequence, the first waveform sequence starts with a high level and has a low level presented within the transmission duration, in which a total duration of the low level presented in the first waveform sequence does not change with a change of the baud rate of the waveform sequence, the second waveform sequence maintains a high level within the transmission duration, the third waveform sequence starts with a low level and ends with a high level, in which a total duration of the low level presented in the third waveform sequence does not change with a change of the baud rate of the waveform sequence, and each waveform sequence in the waveform sequences transmitted in a consecutive manner independently is one of the first waveform sequence, the second waveform sequence and the third waveform sequence; determining a bit sequence of a received data frame according to the waveform sequences transmitted in a consecutive manner, wherein, the first waveform sequence represents a first data bit being one of bit 1 or bit 0, and the second waveform sequence and the third waveform sequence represent a second data bit being the other one of bit 1 and bit 0, respectively; after identifying X waveform sequences corresponding to an end of frame of the received data frame from the waveform sequences transmitted in a consecutive manner, verifying the bit sequence of the received data frame with a parity bit of transmitted data in the received data frame, if the verification is accomplished, acquiring a bit sequence of data to be sent, X being a positive integer, the bit sequence of the data to be sent at least comprising: data to be transmitted, and the data to be transmitted at least comprising: a flag bit for at least indicating the data to be sent being a response message for success of receiving data; controlling a level of a sending port to change according to the waveform sequences corresponding to bits in the bit sequence of the data to be sent and characteristics of the waveform sequences, so as to send the bit sequence of the data to be sent; in which when at least two bits sent in a consecutive manner are the second data bits, a waveform sequence corresponding to a first bit of the at least two bits sent in a consecutive manner is the second waveform sequence, and waveform sequences corresponding to a second bit and subsequent bits are the third waveform sequences.

According to another aspect of the present disclosure, a terminal is provided, including: a level detecting module, a data determining module, a bit sequence acquiring module and a sending module, wherein: the level detecting module is configured to detect a level change of a receiving port; the waveform sequence determining module is configured to determine waveform sequences transmitted in a consecutive manner according to the level change and characteristics of the waveform sequences, wherein a waveform sequence comprises one of a first waveform sequence, a second waveform sequence and a third waveform sequence, and characteristics of the waveform sequences comprise that: the first waveform sequence, the second waveform sequence and the third waveform sequence have an identical transmission duration, the transmission duration is inversely proportional to a baud rate of the waveform sequence, the first waveform sequence starts with a high level and has a low level presented within the transmission duration, in which a total duration of the low level presented in the first waveform sequence does not change with a change of the baud rate of the waveform sequence, the second waveform sequence maintains a high level within the transmission duration, the third waveform sequence starts with a low level and ends with a high level, in which a total duration of the low level presented in the third waveform sequence does not change with a change of the baud rate of the waveform sequence, and each waveform sequence in the waveform sequences transmitted in a consecutive manner independently is one of the first waveform sequence, the second waveform sequence and the third waveform sequence; the data determining module is configured to determine a bit sequence of a received data frame according to the waveform sequences transmitted in a consecutive manner, wherein the first waveform sequence represents a first data bit being one of bit 1 or bit 0, and the second waveform sequence and the third waveform sequence represent a second data bit being the other one of bit 1 and bit 0, respectively; and trigger the bit sequence acquiring module to acquire a bit sequence of data to be sent after identifying X waveform sequences corresponding to an end of frame of the received data frame from the waveform sequences transmitted in a consecutive manner the bit sequence acquiring module is configured to verify the bit sequence of the received data frame with a parity bit of transmitted data in the received data frame after the X waveform sequences corresponding to the end of frame of the received data frame are identified by the data determining module from the waveform sequences transmitted in a consecutive manner, if the verification is accomplished, to acquire the bit sequence of the data to be sent, X being a positive integer, the bit sequence of the data to be sent at least comprising: data to be transmitted, and the data to be transmitted at least comprising: a flag bit for at least indicating the data to be sent being a response message for success of receiving data; the sending module is configured to control a level of a sending port to change according to the waveform sequences corresponding to the bits in the bit sequence of the data to be sent and characteristics of the waveform sequences, so as to send the bit sequence of the data to be sent; in which when at least two bits sent in a consecutive manner are the second data bits, a waveform sequence corresponding to a first bit of the at least two bits sent in a consecutive manner is the second waveform sequence, and waveform sequences corresponding to a second bit and subsequent bits are the third waveform sequences.

BRIEF DESCRIPTION OF THE DRAWINGS

Hereinafter, some specific embodiments of the present disclosure described in detail with reference to drawings are explanatory, and shall not be construed to limit the present disclosure. The same or similar elements and the elements having same or similar functions are denoted by like reference numerals in the drawings. It may be understood by those skilled in the art that the drawings are not necessarily drawn to scale, in which:

FIG. 2 is a schematic diagram of a frame format of a data frame provided by Embodiment 1 of the present disclosure;

FIG. 3 is a schematic diagram of a first waveform sequence provided by Embodiment 1 of the present disclosure;

FIG. 4 is a schematic diagram of a second waveform sequence provided by Embodiment 1 of the present disclosure;

FIG. 5 is a schematic diagram of a third waveform sequence provided by Embodiment 1 of the present disclosure;

DETAILED DESCRIPTION

Embodiment 1

Figure 1:
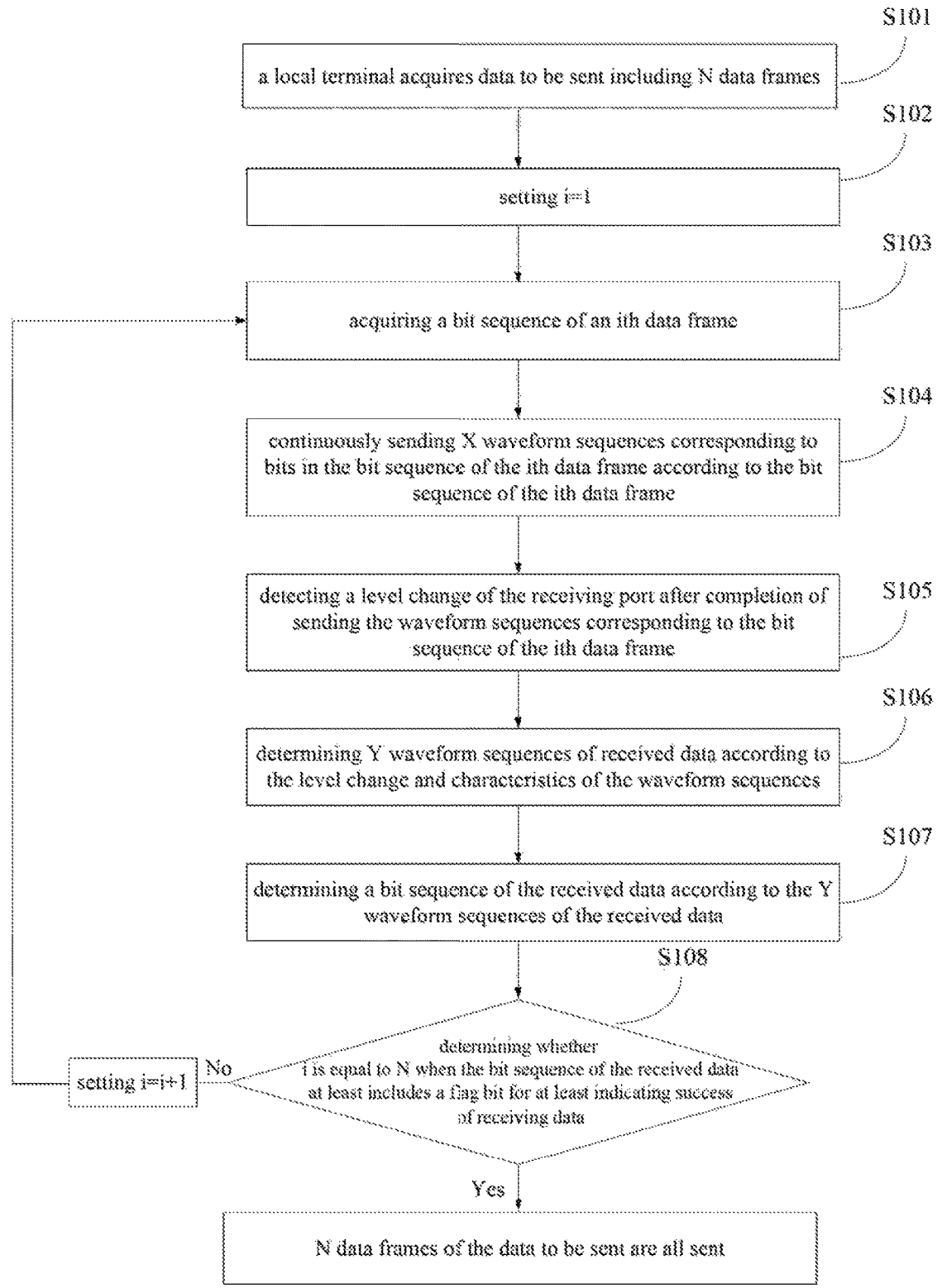
FIG. 1 is a flow chart of a data transmission method provided by Embodiment 1 of the present disclosure.

A data transmission method is provided according to this embodiment of the present disclosure, in which two devices in communication may be referred to as a master device and a slave device, respectively. For example, the master device may be a mobile terminal (such as a PC, a mobile phone, etc.) or a card reader; the slave device may be a USB, an electronic signature device (such as a USB key of Industrial and Commercial Bank of China or a USB key of Agricultural Bank of China) or a smart card. When the master device and the slave device are connected electrically, the slave device may draw power from the master device and the master device may provide power to the slave device while communicating with the slave device. In a quiesced state, a port, where the master device and the slave device are connected, maintains a high level, through which the master device may provide electricity to the slave device, and both the master device and slave device may perform data transmission by controlling a level change of the output of the port as well as perform data reception by detecting a level change of the input of the port. FIG. 1 is a flow chart of an alternative data transmission method according to this embodiment. A local terminal in the embodiment of the present disclosure may be the master device or the slave device.

As shown in FIG. 1, the data transmission method substantially includes the following steps (S101 to S108).

In S101, data to be sent is acquired by a local terminal, in which the data to be sent includes N data frames.

The data to be sent in the present embodiment include N data frames, in which N is a positive integer. The sending terminal is configured to send an $i^{th}$ data frame, in which a value of i is 1, 2 . . . N, sequentially. In other words, the sending terminal is configured to send a first data frame at the beginning, and send a second data frame after completion of sending the first data frame, so that the N data frames are continuously sent until the N data frames of the data to be sent are all sent out, in which each data frame includes a series of bit sequences and the data to be sent are bit sequences including bit sequences of a plurality of data frames. In the present embodiment, one bit corresponds to one waveform sequence. There are several types of waveform sequences, which may be used to represent bit 1 and bit 0, respectively. Details of the waveform sequences will not be described here, but reference may be made to detailed descriptions of the waveform sequences in S104 of the present embodiment.

In the present embodiment, as an alternative implementation, a frame format of a data frame may be as shown in FIG. 2. The data frame may sequentially include: start of frame (SOF) of data, data to be transmitted/transmission data (Byte$_0$, Byte$_1$ ... Byte$_{n-1}$, Byte$_n$) and end of frame (EOF) of data. The SOF of data is represented by waveform sequences corresponding to a bit sequence agreed on in advance between the two devices in communication. With the SOF of data, the receiving terminal may identify a data frame currently being received and determine a starting position (or time) to receive the data to be transmitted in the data frame. Moreover, the SOF of data may further indicate a baud rate of the transmission data of the sending terminal. The baud rate of the transmission data of the sending terminal may be acquired by analyzing the SOF of the receiving terminal, and the baud rate may be used for analyzing the data received. Similarly, the EOF of data is represented by waveform sequences agreed on in advance between the two devices in communication. With the end of frame of data, the receiving terminal identifies an end of data reception. The EOF of data is set distinguishingly from the waveform sequences corresponding to the regular data to be transmitted and the start of frame of data, so as to identify the EOF of data.

In an alternative implementation, a first byte, i.e., Byte$_0$, in the data to be transmitted may be use to identify a type of a message. For instance, an 8-bit Byte$_0$ is defined as follows.

| Bit7 | Bit[6:4] | Bit[3:0] |
|---|---|---|
| Device_type | Rev | Packet_type |

Specifically, Device_type represents a device type of an initiator of the message. For example, 1 represents the master device and 0 represents the slave device, such that a following analysis tool may tell whether the message is sent by the master device or the slave device. Rev represents default data and Packet_type represents a type of messages. For example, 0001B represents an ATR message, which may be a parameter acquiring message. When the ATR message is received by an opposite terminal, a corresponding ATR message that carries corresponding parameters is required to be fed back. For another example, 0010B represents an ACK response message, i.e. a response message indicating a success of receiving data; 0011B represents an NAK message, i.e. a response message indicating that the device is not ready (or a failure on data reception), for instance, the receiving terminal may feed the NAK message back to the sending terminal under circumstances of a data reception failure or a data packet loss; and 0100B represents a PKT message, which indicates that the message is a normal data message. Accordingly, a message may be distinguished, for example as an indicative message or normal data, according to the message type, and the opposite terminal can make a response corresponding to the message type of the received message. In an alternative implementation, the last two bytes, i.e., Byte$_{n-1}$ and Byte$_n$, may be used as cyclic redundancy check (CRC) bits, which may be used to check the bit sequence of a receiving data frame, so as to detect an error in the received data.

In S102, it is set that i=1.

In S103, a bit sequence of an i$^{th}$ data frame is acquired.

In the present embodiment, the bit sequence of the i$^{th}$ data frame is a series of bit strings, including data of different parts of the start of frame, data to be transmitted and the end of frame of the i$^{th}$ data frame.

In S104, X waveform sequences corresponding to bits in the bit sequence of the i$^{th}$ data frame are continuously sent according to the bit sequence of the i$^{th}$ data frame.

Specifically, X is a positive integer, a waveform sequence includes one of a first waveform sequence, a second waveform sequence and a third waveform sequence, and characteristics of the waveform sequences include that: the first waveform sequence, the second waveform sequence and the third waveform sequence have an identical transmission duration, the transmission duration is inversely proportional to a baud rate of the waveform sequence, the first waveform sequence starts with a high level and has a low level presented within the transmission duration, in which a total duration of the low level presented in the first waveform sequence does not change with a change of the baud rate of the waveform sequence, the second waveform sequence maintains a high level within the transmission duration, the third waveform sequence starts with a low level and ends with a high level, in which a total duration of the low level presented in the third waveform sequence does not change with a change of the baud rate of the waveform sequence, and each waveform sequence of the X waveform sequences independently is one of the first waveform sequence, the second waveform sequence and the third waveform sequence. In the present embodiment, different waveform sequences have the same transmission duration, that is, every bit is transmitted during time T. Compared with the method in the prior art that different time intervals are used to transmit different bit values, less time is required in the method according to the present embodiment to transmit the bits, and thus the coding efficiency is higher and costs as well as burdens on the sending and receiving terminals are lowered. In addition, compared with the method in the prior art that bit 0 or bit 1 is represented by a high level or a low level separately, with the waveform sequences provided according to the present embodiment, one of the bit 0 and bit 1 may be represented by the second waveform sequence and the third waveform sequence. In such a way, the high level may be presented as long as possible with respect to the period of the waveform sequences transmitting bits of data, thus improving the power supply efficiency.

Specifically, during sending the i$^{th}$ data frame, the first waveform sequence represents a first data bit being one of bit 1 or bit 0, and the second waveform sequence and the third waveform sequence represent a second data bit being the other one of bit 1 and bit 0, respectively. When at least two bits sent in a consecutive manner are the second data bits, a waveform sequence corresponding to a first bit of the at least two bits sent in a consecutive manner is the second waveform sequence, and waveform sequences corresponding to a second bit and subsequent bits are the third waveform sequences. In the present embodiment, the second data bit is represented by the second waveform sequence or the third waveform sequence, and the second waveform sequence maintains a high level in the transmission duration, thus improving the power-acquiring efficiency.

In the present embodiment, the total duration of the low level presented in the first and third waveform sequences does not change with the change of the baud rate of the waveform sequences. For example, the total duration of the low level presented in the first and third waveform sequences may be preset to a fixed duration. Since the baud rate of the master and slave devices to transmit data frames may be changed, a ratio of the low level presented is changeable, rather than being a fixed proportion. For instance, the duration of the low level is fixed to be 10 ns, when the master device transmits waveform sequences at a baud rate of 50 Mbs, i.e. the transmission duration is 20 ns, the duration of the low level occupies 50% of the transmission duration, i.e., the power-acquiring efficiency of the slave device is 50%; and when the master device transmits waveform sequences at a baud rate of 25 Mbs, i.e. the transmission duration is 40 ns, the duration of the low level occupies 25% of the transmission duration, i.e., the power-acquiring efficiency of the slave device is 75%. Therefore, when the low level has a fixed duration, there is no linear relationship between the duration of the low level in the transmission duration and the baud rate, i.e., the duration of the low level will not be changed with the change of the baud rate for transmitting the waveform sequences. Therefore, the baud rate may be selected according to practical requirements, so as to keep a port connecting the master device and the slave device at a high level as long as possible, thus further improving the power supply efficiency in the communication in the two-wire operation.

In an alternative implementation, the characteristics of the waveform sequences further include that: the total duration of the low level presented in the first waveform sequence is less than half the transmission duration; and/or the total duration of the low level presented in the third waveform sequence is less than half the transmission duration. Therefore, the shorter the duration of the low level presented in the waveform sequences, the longer the duration of the high level maintained at the port connecting the master device and the slave device, thus further improving the power supply efficiency in the communication in the two-wire operation.

In the present embodiment, as an alternative implementation, the first waveform sequence starts with a high level, maintains at the high level for a first preset time period, and jumps to a low level, in which the first preset time period may either be proportional to the transmission duration, or a fixed duration preset after negotiations between two parties, for example, the first preset time period may be fixed to be 10 ns. As an alternative implementation, the first preset time period T1 may meet the following preset relationship: T1=a*T, T being transmission duration, a being a preset duty ratio coefficient and 0<a<1. In the present embodiment, a starting high level of the first waveform sequence is preset as T1, such that a transmission duration T of a waveform sequence may be calculated by T1 with an analysis of the SOF of data.

In the present embodiment, the first waveform sequence and the third waveform sequence may include one falling-edge level jumping transition (or rising-edge level jumping transition) or a plurality of falling-edge level jumping transitions (or rising-edge level jumping transitions). In the present embodiment, since the port connecting the master device and slave device maintains at a high level in the quiesced state, the high level of the port may be controlled to jump to a low level by a hardware switch, a software, etc., as a falling-edge transition, and then the port is controlled to be recovered to the high level, which constitutes a rising-edge transition. As an alternative implementation, the third waveform sequence presents only one transition from a low level to a high level in the transition duration and ends with a high level; the first waveform sequence starts with a high level, presents only one level jumping transition from a high level to a low level in the transmission duration and ends with a low level; or, the first waveform sequence starts with a high level, presents only one level jumping transition from a high level to a low level in the transmission duration and ends with a high level. Compared with the case where one waveform sequence includes a plurality of falling-edge transitions or a plurality of rising-edge transitions, operation at a control terminal may be less complex when only one falling-edge level jumping transition (or rising-edge level jumping transition) is presented in the waveform sequence, and one bit may be transmitted without the need of a plurality of level jumps at the sending port, thus improving data transmission efficiency.

Hereinafter, three waveform sequences of the present embodiment will be described illustratively. FIG. 3 is a schematic diagram of a plurality of the first waveform sequences, FIG. 4 is a schematic diagram of a second waveform sequence and FIG. 5 is a schematic diagram of a plurality of the third waveform sequences. As shown in FIG. 3, the first waveform sequence starts with a high level and jumps to a low level after maintaining the high level for a first preset time period. For example, as illustrated in FIG. 3(a), the transmission duration of the first waveform sequence is 40 ns and the first preset time period that the high level maintains is 10 ns, which accounts for ¼ of the duration of the first waveform sequence. In practice, the master and slave devices are in a connection state all the time. The master device is configured to output the high level in a default state and to power the slave device continuously. When there is a need for the master device to send data, a low level may be formed by an on-off switch of the master device and waveform sequences may be formed by the high and low levels to transmit corresponding bits of data. When outputting the low level, the master device cannot supply power to the slave device. On this basis, in order to supply power to the slave device as efficient as possible, preferably, the total duration of the low level presented in the first waveform sequence may be less than half the transmission duration, and thus the longer the high level lasts during the data transmission, the higher the power supply efficiency is. As shown in FIG. 3(b), the first waveform sequence lasts for 40 ns and the high level lasts for a first preset time period of 30 ns, accounting for ¾ of the duration of the first waveform sequence, and thus the power supply efficiency for transmitting data with the first waveform sequence is relatively higher. Therefore, the power supply efficiency for the first waveform sequence in FIG. 3(b) to transmit data is higher than that in FIG. 3(a). Besides, the waveform of the first waveform sequence may also end with a high level as shown in FIG. 3(c). The second waveform sequence in FIG. 4 maintains a high level in the whole duration, thus the power supply efficiency is further improved. The third waveform sequence starts with a low level and ends with a high level, and the total duration of the low level presented in the third waveform sequence in the transmission duration does not change with the change of the baud rate of the waveform sequence. For example, as shown in FIG. 5(a), the baud rate is 50 Mbps, and the transmission duration of the third waveform sequence is 20 ns. If the lasting time for the low level is fixed to 10 ns, then the duration of the low level accounts for ½ of the transmission duration of the third waveform sequence, so the power-acquiring efficiency of the slave device is 50%. For another example, as shown in FIG. 5(b), the baud rate is 25 Mbps, thus the transmission duration of the third waveform sequence is 40 ns. It is assumed that the lasting time for the low level is still a fixed 10 ns, the duration of the low level then accounts for ¼ of the transmission duration of the third waveform sequence, and the power-acquiring efficiency of the slave machine at this time is 75%. When the low level has a fixed time period, the transmission duration is increased as the baud rate is decreased, and the power-acquiring efficiency is improved. Accordingly, the total duration of the low level in the transmission duration not changing with the change of the baud rate of the waveform sequence may improve the power-acquiring efficiency.

Therefore, the power supply efficiency of the transmission data in the third waveform sequence in FIG. 5(b) is higher than that in FIG. 5(a). In addition, the power supply efficiency may be further improved if the total duration of the low level presented in the third waveform sequence as shown in FIG. 5(b) is less than half the transmission duration.

Figure 6:
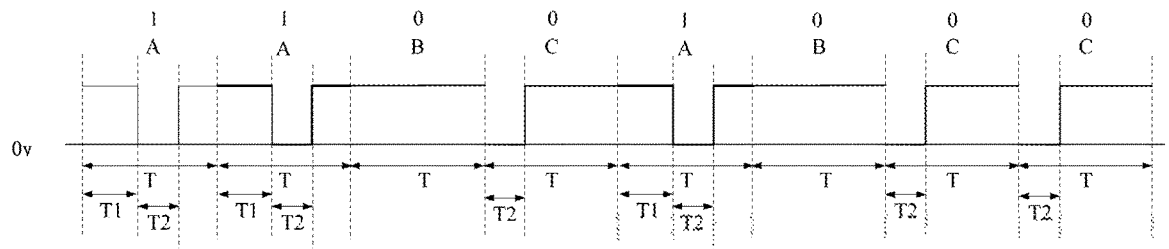
FIG. 6 is a schematic diagram of eight waveform sequences corresponding to a bit sequence 11001000 of an $i^{th}$ data frame provided by Embodiment 1 of the present disclosure.

In the present step, as an alternative implementation, continuously sending the X waveform sequences corresponding to the bits in the bit sequence of the $i^{th}$ data frame according to the bit sequence of the $i^{th}$ data frame may include: controlling a level of a sending port to change according to the X waveform sequences corresponding to the bits in the bit sequence of the $i^{th}$ data frame and characteristics of the waveform sequences, so as to send the $i^{th}$ data frame. For example, it is agreed in communication protocols that: if bit "1" is represented by the first waveform sequence, bit "0" is represented by the second and third waveform sequences. In the present embodiment, the bit sequence of a data frame may be acquired first, in which the waveform sequence corresponding to each bit is determined. For example, the high level and low level of the sending port are generated and controlled by the local terminal, in other words, the high level at the port is turned into a low level by a hardware switch or software, etc., as a falling-edge transition, and then the port is controlled to be recovered to the high level to form a rising-edge transition. A waveform sequence is acquired from high-low level changes generated at the sending port, such that a waveform sequence corresponding to each bit is generated, and waveform sequences corresponding to a data frame is further formed. For instance, if the bit sequence of the $i^{th}$ data frame is 11001000, according to agreements made by communication protocols, eight waveform sequences corresponding to the bit sequence of the $i^{th}$ data frame are AABCABCC sequentially, in which A represents the first waveform sequence. B represents the second waveform sequence and C represents the third waveform sequence. On the basis of the above characteristics of the waveform sequences of each waveform sequence, transmission durations of the first waveform sequence, the second waveform sequence and the third waveform sequence are identical to each other and inversely proportional to the baud rate transmitting the above-mentioned waveform sequence. For example, the transmission duration may be T, the first preset time period of the high level of the first waveform sequence is T1, and low levels in the first and third waveform sequences have a fixed duration of T2, the eight waveform sequences corresponding to the bit sequence 11001000 of the $i^{th}$ data frame may be as shown in FIG. 6. During the process of sending each bit in the $i^{th}$ data frame, a level jumping transition of the sending port is made at a corresponding time, so as to form a waveform sequence corresponding to the bit, thus further forming waveform sequences corresponding to the bit sequence of the data frame, so as to transmit the $i^{th}$ data frame.

In S105, a level change of a receiving port is detected after completion of sending the waveform sequences corresponding to the bit sequence of the $i^{th}$ data frame.

In the present embodiment, as described above, the waveform sequences of the data frame are formed from the changes between the high and low levels at the sending port of the sending terminal as a local terminal. Accordingly, an opposite terminal may be able to send data in the same way. In order to receive data sent by the opposite terminal, the local terminal needs to detect level changes of the receiving port, so as to make waveform sequence identification on the basis of level changes. Specifically, as an alternative implementation, detecting level changes at the receiving port may include: continuously sampling levels at the receiving port to obtain sampled high-low level changes. Alternatively, the level jumping transition, for example a jump from a high level to a low level, at the receiving port may be detected, for example, levels at the receiving port may be detected and compared by a differential amplifier, which may output a falling-edge transition when the jump from the high level to the low level is detected.

In the present embodiment, in order to improve efficiency and accuracy of data retransmission, before a level change of a receiving port is detected and after the X waveform sequences corresponding to the bit sequence of the $i^{th}$ data frame are sent completely, as an alternative implementation, the method provided by the present embodiment further includes following steps. If the level change of the receiving port is detected within a preset time period, a step of detecting the level change of the receiving port is performed. If no level change of the receiving port is detected within the preset time period, i.e., no response data fed back by the opposite terminal is received, the procedure is returned to S103 and S103 to S105 are performed again and thus the $i^{th}$ data frame sent by the local terminal in S105 is retransmit.

In the present embodiment, for the local terminal, a waiting period for waiting for receiving data after sending a data frame may be preset, for example, the waiting period may be 8T, and T is the transmission duration. If data fed back by the opposite terminal is received within the waiting period, it is indicated that the data frame sent by the local terminal is received by the opposite terminal successfully, and then the local terminal may be configured to continue to send the next data frame after the completion of receiving response data on data reception (the ACK response message) fed back by the opposite terminal. If no response data indicating a successful data reception fed back by the opposite terminal is received within the waiting period, the data frame will be retransmitted by the local terminal. Therefore, in the present disclosure, data may be resent without a completion of sending all the data frames of the data to be sent, thus improving the efficiency and the accuracy of data retransmission.

In addition, as an alternative implementation, in the present embodiment, if no level change of the receiving port is detected within the preset time period, it is further included before the operation of returning to S103 for performing a retransmission that: determining whether the number of times of retransmission reaches a preset number, if yes, ending the procedure without returning to S103 for the retransmission, otherwise, returning to S103 for the retransmission. For example, if the preset number is five and a local counter is incremented by 1 for each retransmission, then after five times of retransmission, for instance, the count value of the counter is 5, and if it is determined that no level change of the receiving port is detected within the preset time period and it is determined that the count value of the counter has reached 5, then the procedure is ended, so as to ensure that data transmission efficiency will not be affected while guaranteeing the retransmission.

In S106, Y waveform sequences of received data are determined according to the level change and characteristics of the waveform sequences, in which Y is a positive integer, and each waveform sequence of the Y waveform sequences independently is one of the first waveform sequence, the second waveform sequence and the third waveform sequence.

In the present step, as an alternative implementation, determining Y waveform sequences of received data according to the level change and characteristics of the waveform sequences includes: acquiring a preset duration of a waveform sequence, using the preset duration as the transmission duration of each waveform sequence, and determining the Y waveform sequences of the received data according to the level change and the characteristics of the waveform sequences.

According to the characteristics of the waveform sequences mentioned above, on the premise of acquiring the preset duration of the waveform sequence, both a first preset time period of a starting high level of the first waveform sequence and a second preset time period of a starting high level of the third waveform sequence are determinable. Accordingly, a waveform sequence may be determined as follows. In a transmission duration of a waveform sequence, a type of a starting level of a waveform sequence is determined and when the starting level of the waveform sequence is a high level, a duration of the high level is determined, so as to compare such characteristics of the waveform sequence with those of all the three types of waveform sequences, thus determining the type of the waveform sequence. Alternatively, a level change of the receiving port may be detected, for example, a waveform may be acquired by sampling the level change, so as to compare such characteristics of the waveform sequence with those of all the three types of waveform sequences, thus determining the type of the waveform sequence. For example, in a transmission duration of a waveform sequence, if a starting point (at a starting moment) of the waveform sequence is a low level, the waveform sequence is the third waveform sequence; if the starting point (at a starting moment) of the waveform sequence is a high level and a low level is presented within the transmission duration of the waveform sequence, the waveform sequence is the first waveform sequence; and if a high level is maintained all the time, the waveform sequence is the second waveform sequence. In the present embodiment, the received data sequentially include the start of frame of data, the transmission data and the end of frame of data. After a waveform sequence corresponding to a start of frame of data is detected, a starting point of waveform sequences corresponding to the transmission data in the data frame may be determined. From the starting point, a first waveform sequence may be determined according to the fact that the characteristic of which one of the above waveform sequence types that the detected level change (such as level jumping transition of the falling edge) conforms with, a second waveform sequence may be determined after the transmission duration of the first waveform sequence, and so forth until all waveform sequences corresponding to the transmission data and the end of frame of data in the received data are determined.

Specifically, a preset duration of a waveform sequence may be negotiated by two parties in communication in advance under which case the two parties of communication conduct data transmission by the preset duration (i.e., inversely proportional to a baud rate), or may be analyzed from a start of frame of data. Compared with the former one, in the latter manner, the baud rate may be selected more flexibly for data transmission. A highest baud rate supported by both parties to perform data transmission may be selected according to current transmission environment and a receiving data rate of the opposite terminal. A current baud rate may be acquired simply by analyzing the start of frame of data by the local terminal. Therefore, the highest baud rate that both parties of communication support may be adopted for data transmission, so as to achieve a high-speed data transmission.

As a first alternative implementation, the start of frame of data may include at least one bit, the waveform sequence corresponding to a first bit of the start of frame of data may be the third waveform sequence or the first waveform sequence. Both parties negotiate to use the above waveform sequences as the start of frame of data, such that when the detected level change of the receiving port forms waveform sequences corresponding to the above start of frame of data, it may be determined that currently-received waveform sequences represent the start of frame of data.

The next waveform sequence following the start of frame of data is the starting point of the waveform sequences of the transmission data. As a second alternative implementation, the start of frame of data at least includes M bits, waveform sequences corresponding to the starting M bits of the start of frame of data consists of M first waveform sequences or M third waveform sequences, in which M is a positive integer and M≥2. Alternatively, the waveform sequences corresponding to the starting M bits of the start of frame of data consists of at least one first waveform sequence and at least one third waveform sequence. For the first implementation, in the case where the two parties in communication conduct data transmission with a pre-negotiated baud rate, the start of frame of data may be identified with the above waveform sequences. Compared with the first implementation, in the second implementation, the preset duration of one waveform sequence may be further determined according to the waveform sequences corresponding to the starting M bits of the start of frame of data, i.e., the baud rate for sending data from the sending party may be determined, and thus the data may be sent and received with the baud rate so as to realize self-adaptation of the baud rate. As a third alternative implementation depending on the second implementation, when waveform sequences corresponding to several starting bits of the start of frame of data are same waveform sequences consecutively, in order to avoid single-frequency interference, at least one different waveform sequence may be set to follow the same waveform sequences in a consecutive manner (such as right behind the same waveform sequences or behind parts of the same waveform sequences), i.e., a waveform sequence corresponding to an anti-interference bit. For instance, when the waveform sequences corresponding to the starting M bits of the start of frame of data are M first waveform sequences, the start of frame of data further includes at least one anti-interference bit following the starting M bits of the start of frame of data, and the at least one anti-interference bit is the second waveform sequence or the third waveform sequence. For example, the waveform sequences corresponding to the start of frame of data may be AAAABCBC, in which A represents the first waveform sequence, B represents the second waveform sequence and C represents the third waveform sequence. Alternatively, when the waveform sequences corresponding to the starting M bits of the start of frame of data are M third waveform sequences, the start of frame of data further includes at least one anti-interference bit following the starting M bits of the start of frame of data, a waveform sequence corresponding to at least one of the at least one anti-interference bit may be the first waveform sequence or the second waveform sequence. For example, waveform sequences corresponding to the start of frame of data may be CCCCABCC.

Using the start of frame of data in the third implementation may avoid the single-frequency interference, which may be understood as a pulse sequence generated in a same period. Accordingly, if the start of frame of data consists of a plurality of consecutive identical waveform sequences (such as CCCC) and the frequency of the single-frequency interference happens to be identical to the baud rate, waveform sequences that are the same as the waveform sequences corresponding to the start of frame of data are recognized by the local terminal via the level changes, such that the local terminal may identify the single-frequency interference as a part of the start of frame of data, resulting in a misidentification. However, with waveform sequences differing from the plurality of identical waveform sequences in the consecutive manner presented in the start of frame of data as shown in the third implementation, different time intervals exist for the start of frame of data, and thus no waveform sequence is identical to the single-frequency interference. Therefore, the start of frame of data in such an implementation may be used for avoiding the single-frequency interference.

Figure 7A:
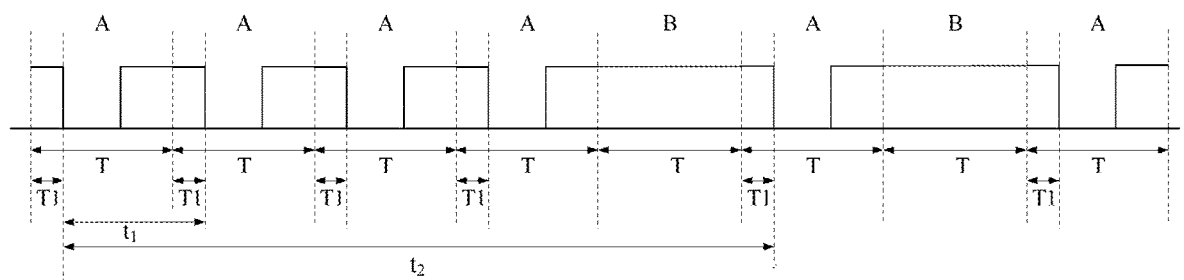
FIG. 7A is a schematic diagram of an $i^{th}$ data frame having a start of frame of AAAABABA provided by Embodiment 1 of the present disclosure.
Figure 7B:
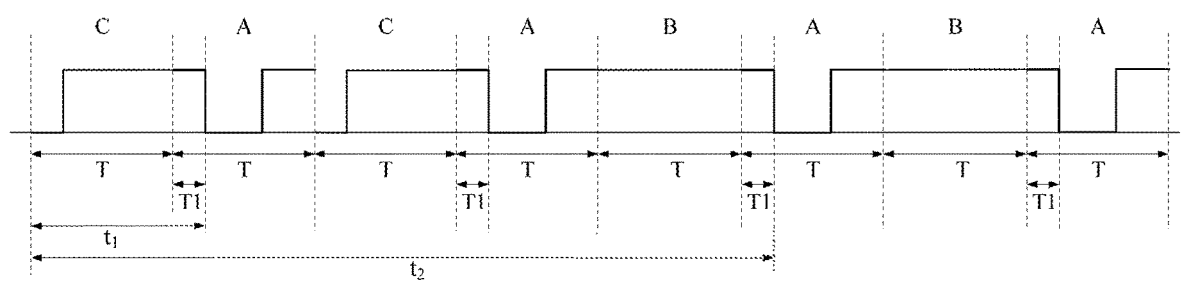
FIG. 7B is a schematic diagram of an $i^{th}$ data frame having a start of frame of CACABABA provided by Embodiment 1 of the present disclosure.

In the present embodiment, a preset duration of a waveform sequence may be obtained through analyzing the start of frame of data mentioned in the aforementioned second and third implementations. The preset duration is used as transmission duration of each waveform sequence. The waveform sequences corresponding to the transmission data and the end of frame of data in the received data are determined according to the level changes and the characteristics of the waveform sequences. As an alternative implementation, a preset duration may be determined as follows. A preset duration of a waveform sequence is calculated according to a time interval between any two identical transitions of waveform sequences corresponding to a start of frame of data, where the identical transitions jumps from a high level to a low level, and each waveform sequence of N waveform sequences corresponding to the preset start of frame of data is independently one of the first waveform sequence, the second waveform sequence and the third waveform sequence. A start of frame of data AAAABABA is taken as an example, as shown in FIG. 7A, a first preset time period T1 of A is T1=¼T (T is the preset duration), the preset duration of the waveform sequence can be calculated according to any two falling-edge transitions in eight waveform sequences. For example, an interval $t_1$ between a first falling-edge level transition and a second falling-edge transition is the preset duration T of the waveform sequence. As another example, an interval $t_2$ between the first falling-edge level transition and a fifth falling-edge level transition is ¾T+4T+¼T, i.e., $t_2$=5T, and thus a time period of the preset duration of the waveform sequence can be determined as T. For another example, CACABABA, as shown in FIG. 7B, a first preset time period T1 of A is T1=¼T (T is the preset duration), a preset duration of a waveform sequence can be calculated according to any two falling-edge transitions in eight waveform sequences. For example, an interval $t_1$ between a first falling-edge level transition and a second falling-edge level transition is T+¼T, i.e., a transmission duration of the third waveform sequence C and a duration T1 of a starting high level of A, indicating $t_1$=5/4T, and thus the preset duration of the waveform sequence can be calculated as T. In another example, an interval $t_2$ between the first falling-edge level transition and a fifth falling-edge level transition is ¾T+4T+¼T, i.e., $t_2$=5T, and thus a time period of the preset duration of the waveform sequence can be determined as T. On this basis, the preset duration may be regarded as transmission duration of every waveform sequence, and the waveform sequences corresponding to the transmission data and the end of frame of data in the received data are determined according to the level changes and the characteristics of the waveform sequences.

For the cases where waveform sequences corresponding to the start of frame of data include other waveform sequences, a preset duration may be determined in a same manner as described in the above examples, which is thus not repeatedly described herein.

In the present embodiment, as an alternative implementation, two parties in communication may agree on the waveform sequences corresponding to the end of frame of data in advance. Specifically, the end of frame of data includes two bits and the corresponding waveform sequences may be formed in any one of following three manners. A waveform sequence corresponding to a first bit of the end of frame of data is the second waveform sequence and a waveform sequence corresponding to a second bit of the end of frame of data is the second waveform sequence, or the waveform sequence corresponding to the first bit of the end of frame of data is the third waveform sequence and the waveform sequence corresponding to the second bit of the end of frame of data is the second waveform sequence, or the waveform sequence corresponding to the first bit of the end of frame of data is the first waveform sequence and the waveform sequence corresponding to the second bit of the end of frame of data is the third waveform sequence. In the present embodiment, when the waveform sequences determined according to the level changes and the characteristics of the waveform sequences are the above-mentioned preset waveform sequences corresponding to the end of frame of data, the data reception ends. In the present embodiment, the waveform sequences corresponding to the start of frame of data and the end of frame of data are predetermined by communication protocols. Generally speaking, it is easy to identify and distinguish the start of frame of data and end of frame of data if the start of frame of data and end of frame of data do not present identical waveform sequences. If the predetermined waveform sequences of the start of frame of data include two waveform sequences of the end of frame of data, some strategies may be applied to distinguish the start of frame of data from the end of frame of data. For example, the start of frame of data may be preset to have 8 bits, i.e., consisting of eight waveform sequences, and the end of frame of data may be preset to have two waveform sequences, such that the start of frame and the end of frame can be distinguished from each other. In the quiesced state, since a high level is maintained at the receiving port, a procedure of receiving the start of frame of data starts once the a first falling-edge transition is detected at the receiving port and the procedure of receiving the start of frame of data ends after 8 preset waveform sequences corresponding to the start of frame of data are detected. Accordingly, waveform sequences corresponding to the start of frame of data and the end of frame of data are not particularly limited in the present disclosure as long as they can be distinguished from each other.

In S107, a bit sequence of the received data is determined according to the Y waveform sequences of the received data.

On the basis of a preset corresponding relationship between waveform sequences and bits, after Y waveform sequences of the received data are determined. Y bits corresponding to the Y waveform sequences, i.e., a bit sequence of the received data may be obtained correspondingly. For instance, communication protocols stipulate that bit "1" is represented by the first waveform sequence and bit "0" is represented by the second waveform sequence and the third waveform sequence respectively.

Specifically, during the determination of the bit sequence of the received data, it is possible to determine one waveform sequence and then to acquire a corresponding bit by analysis. It is also possible to determine all the Y waveform sequences and then to acquire Y corresponding bits by analysis. Compared with the latter manner, the former manner has a higher efficiency on analyzing the bit sequences. However, no limitation for determining the bit sequence of the received data is made in the present embodiment.

In S108, it is determined whether i is equal to N when the bit sequence of the received data at least includes a flag bit for at least indicating success of receiving data. If no, it is set that i=i+1 and the procedure returns to S103, i.e., sending a next data frame; if yes, it is indicated that N data frames of the data to be sent are all sent.

In the present embodiment, after an $i^{th}$ data frame is sent, an $(i+1)^{th}$ data frame is sent only when an ACK response message is fed back from the opposite terminal, and all the data frames are transmitted as set forth.

In the present embodiment, the opposite terminal is configured to feed the ACK response message back to the local terminal only when the $i^{th}$ data frame is successfully received. In other words, the bit sequence of the received data at least includes the flag bit for at least indicating the success of receiving data. In S107, it is possible to determine the bit sequence of the received data according to the Y waveform sequences of the received data. If the flag bit indicating success of receiving data is included in the determined bit sequence of the received data, it is illustrated that the received message is the ACK response message. If the $i^{th}$ data frame is not received or a wrong frame is received within the preset waiting period by the opposite terminal, the ACK response message will not be fed back to the local terminal. Accordingly, as an alternative implementation, when the bit sequence of the received data does not include the flag bit for at least indicating the success of receiving data, the procedure is returned to S103 directly and the $i^{th}$ data frame is retransmitted, i.e., retransmitting the first data frame, rather than performing the step of determining whether i is equal to N (if no, it is set that i=i+1). In the present embodiment, data may be retransmitted without a completion of sending all the data frames of the data to be sent, thus improving the efficiency and the accuracy of data retransmission.

Embodiments of the present disclosure provide a computer program, when executed by a processor, causes the processor to perform above method.

With the data transmission method provided according to the embodiment of the present disclosure, in which a bit sequence may be represented by waveform sequences showing changes between the high level and the low level, the effect of providing electricity for a slave device may be achieved during communication. Furthermore, in data transmission, the duration of the high level in the waveform sequence is set as long as possible, so as to guarantee that the slave device can have a high power-acquiring efficiency and a high coding efficiency, thus reducing costs and burdens on sending and receiving terminals. In addition, in the present embodiment, after sending one data frame, the local terminal continues to send a next data frame only when the local terminal receives the ACK message (data indicating the success of receiving data) fed back by the opposite terminal. If no ACK response message is received within the preset waiting period, the one data frame is resent. In the present embodiment, data may be resent without a completion of sending all the data frames of the data to be sent, and thus the efficiency and accuracy of data retransmission are improved and data transmission amount is reduced compared with the existing methods retransmitting all the data.

Embodiment 2

Figure 8:
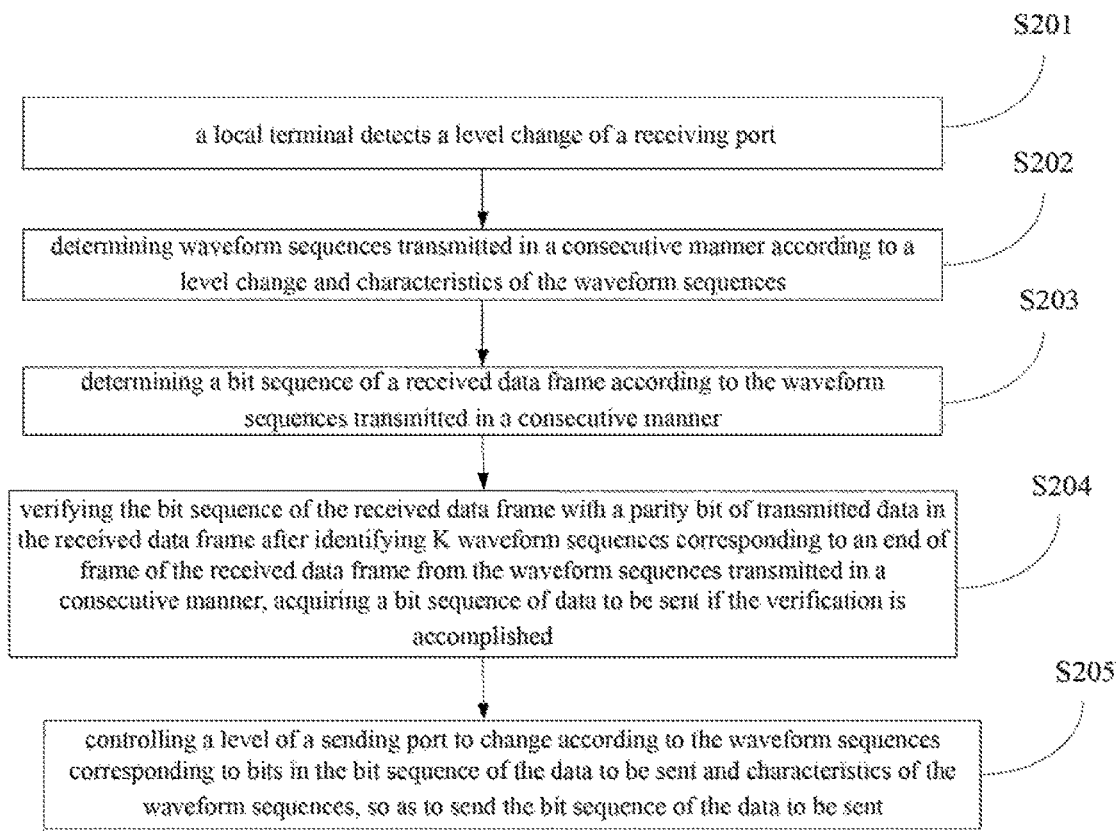
FIG. 8 is a flow chart of a data transmission method provided by Embodiment 2 of the present disclosure.

A data transmission method is provided according to the present embodiment. FIG. 8 is a flow chart of an alternative data transmission method according to the present embodiment. The local terminal mentioned in the embodiment of the present disclosure may either be a master device or a slave device.

As shown in FIG. 8, the data transmission method includes the following steps (S201 to S205).

In S201, a level change of a receiving port is detected by a local terminal.

In the present embodiment, an opposite terminal is configured to control a sending port of a sending terminal to generate changes between high and low levels to form a waveform sequence of a data frame, as described in Embodiment 1. Accordingly, in order to receive data sent by the opposite terminal by a local terminal, level changes of a receiving port is required to be detected, so as to make waveform sequence identification on the basis of the level changes. Specifically, as an alternative implementation, detecting the level changes at the receiving port may include: continuously sampling levels at the receiving port to obtain sampled high-low level changes. Alternatively, the level jumping transition, for example a jump from a high level to a low level, at the receiving port may be detected, for example, levels at the receiving port may be detected and compared by a differential amplifier, which may output a falling-edge transition when the jump from the high level to the low level is detected.

In S202, waveform sequences transmitted in a consecutive manner are determined according to the level change and characteristics of the waveform sequences.

Specifically, a waveform sequence includes one of a first waveform sequence, a second waveform sequence and a third waveform sequence, and each waveform sequence in the waveform sequences transmitted in a consecutive manner is independently one of the first waveform sequence, the second waveform sequence and the third waveform sequence. Characteristics of each waveform sequence may be described with reference to the descriptions on characteristics of waveform sequences mentioned in Embodiment 1. The first waveform sequence, the second waveform sequence and the third waveform sequence may also be described with reference to the specific descriptions in Embodiment 1.

In the present step, as an alternative implementation, determining waveform sequences transmitted in a consecutive manner according to the level change and characteristics of the waveform sequences includes: acquiring a preset duration of a waveform sequence, using the preset duration as the transmission duration of each waveform sequence, and determining the waveform sequences transmitted in a consecutive manner according to the level change and the characteristics of the waveform sequences.

In the present step, regarding specific implementations of determining the waveform sequences transmitted in a consecutive manner according to the level change and the characteristics of the waveform sequences as well as specific implementations of acquiring transmission duration of a waveform sequence, references may be made to specific descriptions in S106 of Embodiment 1.

In S203, a bit sequence of a received data frame is determined according to the waveform sequences transmitted in a consecutive manner.

After the waveform sequences transmitted in a consecutive manner are determined, the bit sequence of the received data frame is obtained by analysis with a preset corresponding relationship between waveform sequences and bits. For example, the first waveform sequence represents a first data bit being one of bit 1 or bit 0, and the second waveform sequence and the third waveform sequence represent a second data bit being the other one of bit 1 and bit 0, respectively. Specifically, for example, bit "1" is represented by the first waveform sequence and bit "0" is represented by the second waveform sequence and the third waveform sequence respectively.

Specifically, during the determination of the bit sequence of the received data frame, it is possible to determine one waveform sequence and then to acquire a corresponding bit by analysis. It is also possible to determine all the waveform sequences of the received data frame and then to acquire corresponding bits by analysis. Compared with the latter manner, the former manner has a higher efficiency on analyzing the bit sequences. However, no limitation for determining the bit sequence of the received data is made in the present embodiment.

In S204, after identifying K waveform sequences corresponding to an end of frame of the received data frame from the waveform sequences transmitted in a consecutive manner, the bit sequence of the received data frame is verified with a parity bit of transmitted data in the received data frame, if the verification is accomplished, a bit sequence of data to be sent is acquired, in which K is a positive integer, the bit sequence of the data to be sent at least includes data to be transmitted, and the data to be transmitted at least includes a flag bit for at least indicating the data to be sent being a response message for success of receiving data.

In the present embodiment, the received data frame includes a start of frame of data, transmission data and an end of frame of data sequentially, in which detailed descriptions on the start of frame of data and the method of determining the start of frame of data may be found in the descriptions in S106 of Embodiment 1. In the present embodiment, as an alternative implementation, waveform sequences corresponding to the end of frame of data may be preset. Specifically, A waveform sequence corresponding to a first bit of the end of frame of data is the second waveform sequence and a waveform sequence corresponding to a second bit of the end of frame of data is the second waveform sequence, or the waveform sequence corresponding to the first bit of the end of frame of data is the third waveform sequence and the waveform sequence corresponding to the second bit of the end of frame of data is the second waveform sequence, or the waveform sequence corresponding to the first bit of the end of frame of data is the first waveform sequence and the waveform sequence corresponding to the second bit of the end of frame of data is the third waveform sequence. In the present embodiment, when the above-mentioned preset waveform sequences corresponding to the end of frame of data are identified from the waveform sequences transmitted in a consecutive manner, the data reception ends.

In addition, FIG. 2 illustrates a frame format of a data frame as described in Embodiment 1, in which the last two bytes, $Byte_{n-1}$, and $Byte_n$ in the transmission data of the received data frame can be used as CRC bits. In this step, the bit sequence of the received data frame may be verified with the CRC bits. If the verification is accomplished, it indicates that the received data frame is correct. After receiving the data frame successfully, the ACK response message is sent from the local terminal to the opposite terminal. In other words, the local terminal is configured to acquire the bit sequence of the data to be sent and feed the data frame carrying the flag bit (at least indicating that the data to be sent is the response message for success of receiving data) back to the opposite terminal, such that the opposite terminal may continue to send a next data frame when receives the ACK response message.

In addition, if the verification is not accomplished with the CRC, it indicates that an error happens to the data reception. Accordingly, when the verification is not accomplished with the CRC, a NAK response message is fed back to the opposite terminal to indicate that data are received unsuccessfully, such that the opposite terminal may retransmit the data that are received unsuccessfully. The way to feed the NAK response message back to the opposite terminal is the same as the way to feed the ACK response message back to the opposite terminal, except that indicative information contained in the data to be sent indicates a data reception failure, rather than a data reception success. In other words, after the K waveform sequences corresponding to the end of frame of data of the received data frame are identified from the waveform sequences transmitted in a consecutive manner, if the verification on the bit sequence of the received data frame according to the data-transmitting parity bit in the received data frame fails, the bit sequence of the data to be sent is acquired. Specifically, the bit sequence of the data to be sent at least includes data to be transmitted, and the data to be transmitted at least includes: a flag bit which at least indicates that the data to be sent is a response message for a failure of receiving data.

In S205, a level of a sending port is controlled to change according to the waveform sequences corresponding to bits in the bit sequence of the data to be sent and characteristics of the waveform sequences, so as to send the bit sequence of the data to be sent.

Specifically, the first waveform sequence represents a first data bit being one of bit 1 or bit 0, and the second waveform sequence and the third waveform sequence represent a second data bit being the other one of bit 1 and bit 0, respectively. When at least two bits sent in a consecutive manner are the second data bits, a waveform sequence corresponding to a first bit of the at least two bits sent in a consecutive manner is the second waveform sequence, and waveform sequences corresponding to a second bit and subsequent bits are the third waveform sequences.

For example, it is agreed in communication protocols that: if bit "1" is represented by the first waveform sequence, bit "0" is represented by the second and third waveform sequences. In the present embodiment, the waveform sequence corresponding to each bit is determined. For example, the high level and low level of the sending port are generated and controlled by the local terminal, in other words, the high level at the port is turned into a low level by a hardware switch or software, etc., as a falling-edge transition, and then the port is controlled to be recovered to the high level to form a rising-edge transition. A waveform sequence is acquired from high-low level changes generated at the sending port, such that a waveform sequence corresponding to each bit is generated, and waveform sequences corresponding to a data frame is further formed. For instance, if the bit sequence of the data to be sent is 11001000, according to agreements made by communication protocols, eight waveform sequences corresponding to the bit sequence of the data to be sent are sequentially the first waveform sequence, the first waveform sequence, the second waveform sequence, the third waveform sequence, the first waveform sequence, the second waveform sequence, the third waveform sequence and the third waveform sequence. On the basis of the above characteristics of the waveform sequences of each waveform sequence, transmission durations of the first waveform sequence, the second waveform sequence and the third waveform sequence are identical to each other and inversely proportional to the baud rate transmitting the above-mentioned waveform sequences (for example, the transmission duration is T), waveform sequences corresponding to the bit sequence 11001000 of the data to be sent may be as shown in FIG. 6. During the process of sending each bit in the data to be sent, a level jumping transition of the sending port is made at a corresponding time, so as to form a waveform sequence corresponding to the bit, and further to form waveform sequences corresponding to the bit sequence of the data to be sent, so as to transmit the data to be sent.

Embodiments of the present disclosure provide a computer program, when executed by a processor, causes the processor to perform the above method.

With the data transmission method provided according to the embodiment of the present disclosure, in which a bit sequence may be represented by waveform sequences showing changes between the high level and the low level, the effect of providing electricity for a slave device may be achieved during communication. Furthermore, in data transmission, the duration of the high level in the waveform sequence is set as long as possible, so as to guarantee that the slave device can have a high power-acquiring efficiency. Moreover, in the present embodiment, the local terminal is configured to feed the ACK response message back to the opposite terminal when the data frame sent by the opposite terminal is successfully received by the local terminal. In a case that an error happens to the data reception, the local terminal is configured to send the NAK response message to the opposite terminal, such that the data frame that the local terminal fails to receive will be resent in time by the opposite terminal. Therefore, in the present embodiment, data may be resent without a completion of receiving all the data frames sent by the opposite terminal, and thus the efficiency and accuracy of data retransmission are improved and data transmission amount is reduced compared with the existing methods retransmitting all the data.

Embodiment 3

Figure 9:
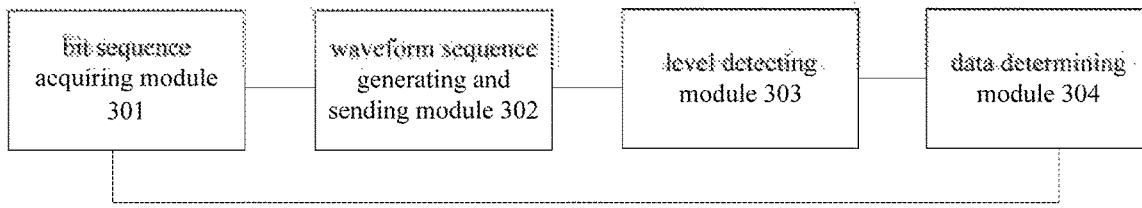
FIG. 9 is a structure block diagram of a terminal provided by Embodiment 3 of the present disclosure.

A terminal is provided according to the present embodiment, and the terminal may be applied in the data transmission method according to Embodiment 1, i.e., applied as the local terminal in Embodiment 1. The terminal may be a master device or a slave device. As shown in FIG. 9, the terminal 30 includes: a bit sequence acquiring module 301, a waveform sequence generating and sending module 302, a level detecting module 303 and a data determining module 304.

The bit sequence acquiring module 301 is configured to acquire data to be sent, the data to be sent including N data frames; and to acquire a bit sequence of an $i^{th}$ data frame, a value of i being 1, 2, 3 . . . N sequentially, N being a positive integer.

The waveform sequence generating and sending module 302 is configured to continuously send X waveform sequences corresponding to bits in the bit sequence of the $i^{th}$ data frame according to the bit sequence of the $i^{th}$ data frame, in which X is a positive integer. Each waveform sequence includes one of a first waveform sequence, a second waveform sequence and a third waveform sequence. The first waveform sequence, the second waveform sequence and the third waveform sequence have the following characteristics. The first waveform sequence, the second waveform sequence and the third waveform sequence have an identical transmission duration that is inversely proportional to a baud rate of the waveform sequence. Moreover, the first waveform sequence starts with a high level and has a low level presented within the transmission duration, in which a total duration of the low level presented in the first waveform sequence does not change with a change of the baud rate of the waveform sequence, the second waveform sequence maintains a high level within the transmission duration, the third waveform sequence starts with a low level and ends with a high level, in which a total duration of the low level presented in the third waveform sequence does not change with a change of the baud rate of the waveform sequence, and each waveform sequence of the X waveform sequences independently is one of the first waveform sequence, the second waveform sequence and the third waveform sequence. In the present embodiment, different waveform sequences have the same transmission duration, that is, every bit is transmitted during time T. Compared with the method in the prior art that different time intervals are used to transmit different bit values, less time is required in the method according to the present embodiment to transmit the bits, and thus the coding efficiency is higher and costs as well as burdens on the sending and receiving terminals are lowered. In addition, compared with the method in the prior art that bit 0 or bit 1 is represented by a high level or a low level separately, with the waveform sequences provided according to the present embodiment, one of the bit 0 and bit 1 may be represented by the second waveform sequence and the third waveform sequence. In such a way, the high level may be presented as long as possible with respect to the period of the waveform sequences transmitting bits of data, thus improving the power supply efficiency.

The level detecting module 303 is configured to detect a level change of a receiving port after the X waveform sequences corresponding to the bit sequence of the $i^{th}$ data frame are sent completely by the waveform sequence generating and sending module.

The data determining module 304 is configured to determine Y waveform sequences of received data according to the level change and characteristics of the waveform sequences, Y being a positive integer, and each waveform sequence of the Y waveform sequences independently being one of the first waveform sequence, the second waveform sequence and the third waveform sequence; to determine a bit sequence of the received data according to the Y waveform sequences of the received data; and trigger the bit sequence acquiring module to acquire a bit sequence of an $(i+1)^{th}$ data frame when the bit sequence of the received data at least comprises a flag bit for at least indicating success of receiving data.

The bit sequence acquiring module 301 is further configured to acquire the bit sequence of the $(i+1)^{th}$ data frame when being triggered by the data determining module.

The waveform sequence generating and sending module 302 is further configured to continuously send Z waveform sequences corresponding to bits in the bit sequence of the $(i+1)^{th}$ data frame according to the bit sequence of the $(i+1)^{th}$ data frame until all the N data frames of the data to be sent are sent, Z being a positive integer, and each waveform sequence of the Z waveform sequences independently being one of the first waveform sequence, the second waveform sequence and the third waveform sequence.

Specifically, when the N data frames of the data to be sent are sent by the waveform sequence generating and sending module, the first waveform sequence represents a first data bit being one of bit 1 or bit 0, and the second waveform sequence and the third waveform sequence represent a second data bit being the other one of bit 1 and bit 0, respectively: when at least two bits sent in a consecutive manner are the second data bits, a waveform sequence corresponding to a first bit of the at least two bits sent in a consecutive manner is the second waveform sequence, and waveform sequences corresponding to a second bit and subsequent bits are the third waveform sequences.

With the terminal provided in the present embodiment, while transmitting a data bit, the duration of the high level in the waveform sequence is set as long as possible, so as to guarantee that the slave device can have a high power-acquiring efficiency and a high coding efficiency, thus reducing costs and burdens on sending and receiving terminals.

Specifically, references may be made to relevant descriptions in Embodiment 1 as well as FIGS. 2 to 7 (FIG. 7 includes FIGS. 7A and 7B).

With the terminal provided according to the embodiment of the present disclosure, the effect of providing electricity for a slave device may be achieved during communication. Furthermore, in data transmission, the duration of the high level in the waveform sequence is set as long as possible, so as to guarantee that the slave device can have a high power-acquiring efficiency and a high coding efficiency, thus reducing costs and burdens on sending and receiving terminals. In addition, in the present embodiment, after sending one data frame, the local terminal (the terminal 30) continues to send a next data frame only when the local terminal receives the ACK message (data indicating the success of receiving data) fed back by the opposite terminal. If no ACK response message is received within the preset waiting period, the one data frame is resent. In the present embodiment, data may be resent without a completion of sending all the data frames of the data to be sent, and thus the efficiency and accuracy of data retransmission are improved and data transmission amount is reduced compared with the existing methods retransmitting all the data.

Embodiment 4

Figure 10:
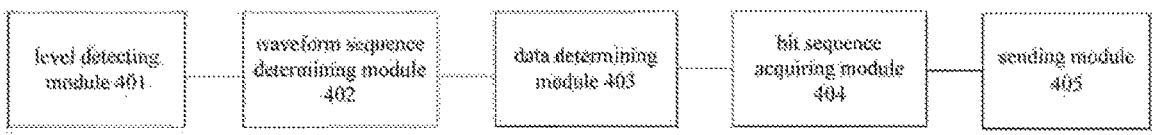
FIG. 10 is a structure block diagram of a terminal provided by Embodiment 4 of the present disclosure.

A terminal is provided by the present embodiment, and the terminal may be applied in the data transmission method in Embodiment 2, i.e., applied as the local terminal in Embodiment 2. The terminal may be a master device or a slave device. As shown in FIG. 10, the terminal 40 includes: a level detecting module 401, a waveform sequence determining module 402, a data determining module 403, a bit sequence acquiring module 404 and a sending module 405.

The level detecting module 401 is configured to detect a level change of a receiving port.

The waveform sequence determining module 402 is configured to determine waveform sequences transmitted in a consecutive manner according to the level change and characteristics of the waveform sequences, in which a waveform sequence includes one of a first waveform sequence, a second waveform sequence and a third waveform sequence. Characteristics of each waveform sequence may be referred to descriptions of the waveform sequences mentioned in Embodiment 1, and specific descriptions of the first waveform sequence, the second waveform sequence and the third waveform sequence may further be referred to specific descriptions in Embodiment 3. In the present embodiment, different waveform sequences have the same transmission duration, that is, every bit is transmitted during time T. Compared with the method in the prior art that different time intervals are used to transmit different bit values, less time is required in the method according to the present embodiment to transmit the bits, and thus the coding efficiency is higher and costs as well as burdens on the sending and receiving terminals are lowered. In addition, compared with the method in the prior art that bit 0 or bit 1 is represented by a high level or a low level separately, with the waveform sequences provided according to the present embodiment, one of the bit 0 and bit 1 may be represented by the second waveform sequence and the third waveform sequence. In such a way, the high level may be presented as long as possible with respect to the period of the waveform sequences transmitting bits of data, thus improving the power supply efficiency.

The data determining module 403 is configured to determine a bit sequence of a received data frame according to the waveform sequences transmitted in a consecutive manner, in which the first waveform sequence represents a first data bit being one of bit 1 or bit 0, and the second waveform sequence and the third waveform sequence represent a second data bit being the other one of bit 1 and bit 0, respectively; and to trigger the bit sequence acquiring module to acquire a bit sequence of data to be sent after identifying K waveform sequences corresponding to an end of frame of the received data frame from the waveform sequences transmitted in a consecutive manner.

The bit sequence acquiring module 404 is configured to verify the bit sequence of the received data frame with a parity bit of transmitted data in the received data frame after the X waveform sequences corresponding to the end of frame of the received data frame are identified by the data determining module from the waveform sequences transmitted in a consecutive manner, if the verification is accomplished, to acquire the bit sequence of the data to be sent, X being a positive integer, the bit sequence of the data to be sent at least comprising: data to be transmitted, and the data to be transmitted at least comprising: a flag bit for at least indicating the data to be sent being a response message for success of receiving data.

The sending module 405 is configured to control a level of a sending port to change according to the waveform sequences corresponding to the bits in the bit sequence of the data to be sent and characteristics of the waveform sequences, so as to send the bit sequence of the data to be sent; in which when at least two bits sent in a consecutive manner are the second data bits, a waveform sequence corresponding to a first bit of the at least two bits sent in a consecutive manner is the second waveform sequence, and waveform sequences corresponding to a second bit and subsequent bits are the third waveform sequences.

With the terminal provided in the present embodiment, while transmitting a data bit, the duration of the high level in the waveform sequence is set as long as possible, so as to guarantee that the slave device can have a high power-acquiring efficiency and a high coding efficiency, thus reducing costs and burdens on sending and receiving terminals.

Specifically, references may be made to relevant descriptions in Embodiment 2 as well as FIGS. 2 to 7 (FIG. 7 includes (FIGS. 7A and 7B).

With the terminal provided according to the embodiment of the present disclosure, the effect of providing electricity for a slave device may be achieved during communication. Furthermore, in data transmission, the duration of the high level in the waveform sequence is set as long as possible, so as to guarantee that the slave device can have a high power-acquiring efficiency. Moreover, in the present embodiment, the local terminal (the terminal 40) is configured to feed the ACK response message back to the opposite terminal when the data frame sent by the opposite terminal is successfully received by the local terminal. In a case that an error happens to the data reception, the local terminal is configured to send the NAK response message to the opposite terminal, such that the data frame that the local terminal fails to receive will be resent in time by the opposite terminal. Therefore, in the present embodiment, data may be resent without a completion of receiving all the data frames sent by the opposite terminal, and thus the efficiency and accuracy of data retransmission are improved and data transmission amount is reduced compared with the existing methods retransmitting all the data.

Embodiment 5

Figure 11:
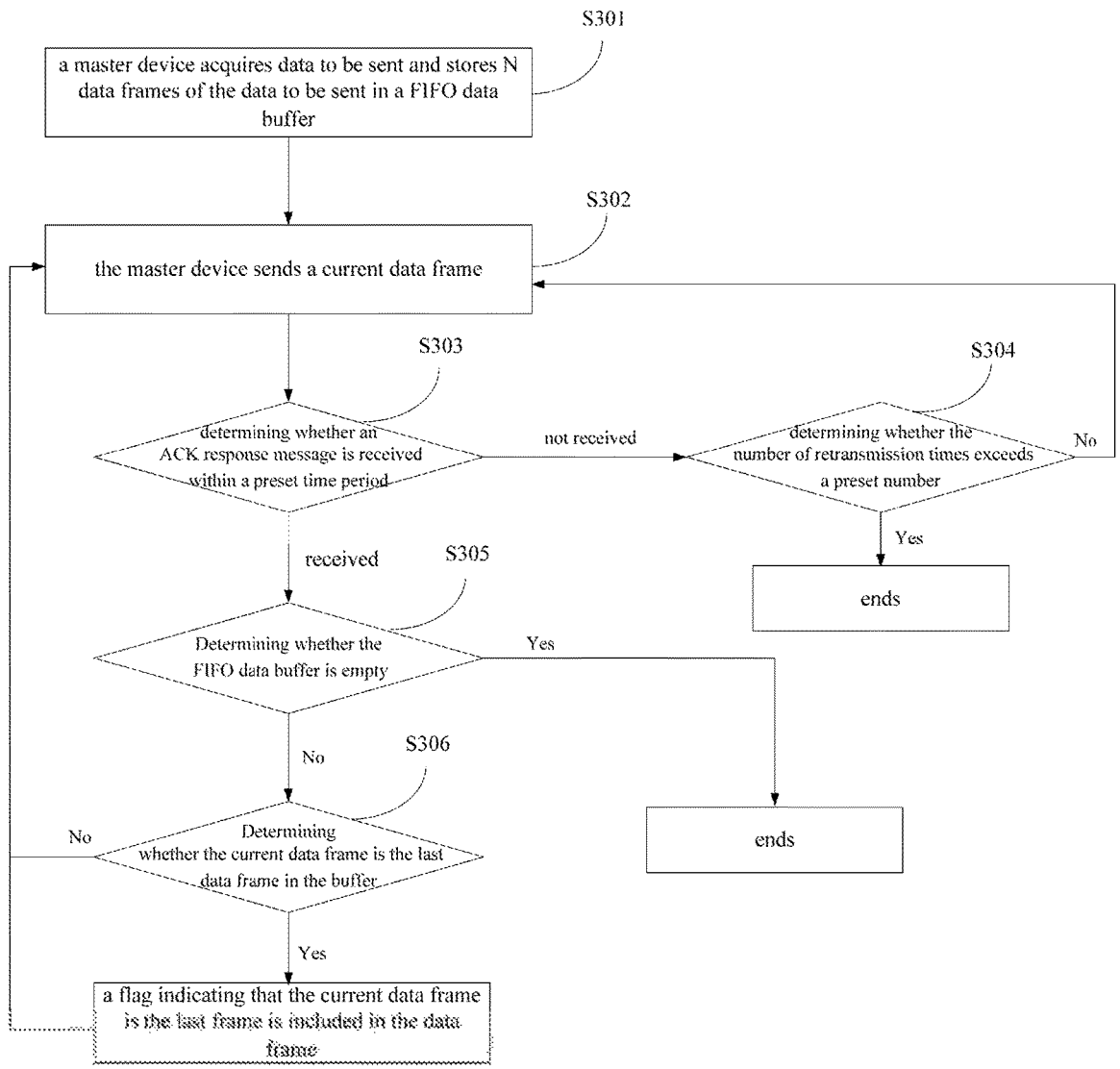
FIG. 11 is a flow chart of a data transmission method provided by Embodiment 5 of the present disclosure.

For the data transmission method provided in Embodiment 1, an alternative data transmission method is provided by the present embodiment, in which the local terminal is a master device. FIG. 11 is a flow chart of a data transmission method according to the present embodiment.

As illustrated in FIG. 11, the data transmission method includes the following steps (S301 to S307).

In S301, data to be sent is acquired by the master device and N data frames of the data to be sent are stored in a FIFO data buffer, in which N is a positive integer.

Each data frame is a series of bit sequences, and the data to be sent is made up of bit sequences of a plurality of data frames. The frame format of a data frame may be referred to descriptions in S101 in Embodiment 1, and thus will not be described in detail herein again.

In S302, a current data frame is sent by the master device.

Specifically, the current data frame sent by the master device is a data frame taken out from the FIFO data buffer, and may be an $i^{th}$ data frame of the N data frames, in which the value of i is 1, 2, 3 . . . N.

In the present embodiment, a high level is maintained at a sending port in a quiesced state. When the data transmission starts at the sending port, a level of the sending port is controlled to change according to waveform sequences corresponding to a bit sequence of the $i^{th}$ data frame and characteristics of the waveform sequences, so as to send the $i^{th}$ data frame. Specifically, with respect to the method for the master device to send the $i^{th}$ data frame, types of the waveform sequences and characteristics of the waveform sequences, reference may be made to descriptions in S104 in Embodiment 1, and thus will not be described in detail herein again. Therefore, it may be guaranteed that the slave device may have a relative high power-acquiring efficiency in the process of sending data.

In S303, timing is performed after a completion of sending the current data frame, and it is determined whether an ACK response message is received within a preset time period. If yes, S305 is performed; if no, S304 is performed.

In the present embodiment, the master device will continue to send a next data frame to the slave device only when it receives an ACK response message fed back by the slave device, thus improving data transmission accuracy and reducing data transmission amount. A timer in the master device is configured to preset an ACK waiting period, which may be set according to a baud rate and experience of a person skilled in the art. If the preset waiting period has been exceeded, even if the ACK response message fed back by the slave device is received, it will still be determined by the master device that an error happens to the data reception of the slave device, and thus S304 for a retransmission is performed. Specifically, the level changes of the receiving port are detected, waveform sequences are further determined according to the level changes and characteristics of the waveform sequences, and a bit sequence of the received data is determined according to a corresponding relationship between a waveform sequence and a bit, and thus it can be determined whether the received data includes indicative information of the ACK response message. Specific methods may be referred to descriptions in steps S105-S108 in Embodiment 1, and thus will not be described in detail herein again.

In S304, it is determined whether the number of retransmission times exceeds a preset number, if yes, the procedure is ended, and if no, the procedure is returned to S302.

In S305, it is determined whether the FIFO data buffer is empty, if yes, the procedure of sending data ends, and if no, S306 is performed.

In S306, the next data frame is taken from the FIFO data buffer as a current data frame and it is determined whether the current data frame is the last data frame in the buffer, if yes, S307 is performed, and if no, S301 is performed directly for sending the current data frame.

In S307, a flag indicating that the current data frame is the last frame is included in the data frame, the procedure is returned to S301.

Specifically, the flag indicating that the current data frame is the last frame may be added into the data frame as follows. At least 1-bit flag indicating that the current data frame is the last frame is included in transmission data of the data frame.

Embodiment 6

Figure 12:
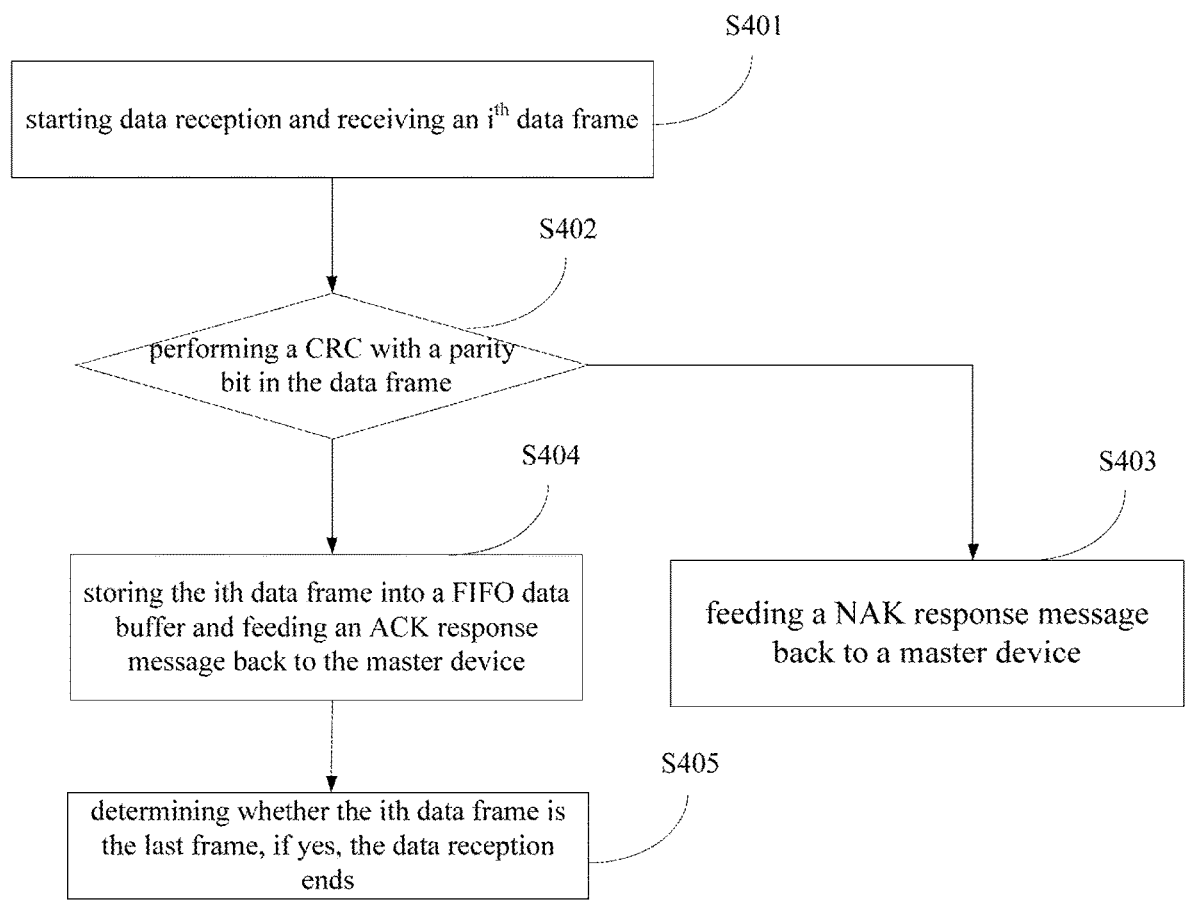
FIG. 12 is a flow chart of a data transmission method provided by Embodiment 6 of the present disclosure.

For the data transmission method provided in Embodiment 2, an alternative data transmission method is provided by the present embodiment, in which the local terminal is a slave device. FIG. 12 is a flow chart of a data transmission method according to the present embodiment.

As illustrated in FIG. 12, the data transmission method includes the following steps (S401 to S405).

In S401, data reception starts, and an $i^{th}$ data frame is received.

In the present embodiment, a high level is maintained at a receiving port in a quiesced state. When a falling-edge transition is detected in the level of the receiving port, data reception starts. The first falling-edge transition is a waveform sequence corresponding to a first bit of the $i^{th}$ data frame, the value of i being 1, 2, 3 . . . N sequentially, and N being a positive integer. For the sake of data transmission, first several waveform sequences in the start of frame of data normally will not set as the second waveform sequences by the two parties in communication, otherwise, this may raise difficulties for a receiving port to detect level changes and in identifying the start of frame of data. Accordingly, for convenience, the first waveform sequence of the start of frame of data will at least be arranged as the first waveform sequence or the third waveform sequence, such that the first falling-edge transition detected by the receiving port is the waveform sequence corresponding to the first bit, and thus the start of frame of data may be identified by the receiving terminal. Specifically, the $i^{th}$ data frame is received, the level changes of the receiving port are detected, waveform sequences are further determined according to the level changes and characteristics of the waveform sequences, and a bit sequence of the received data is determined according to a corresponding relationship between a waveform sequence and a bit. Specific methods may be referred to descriptions in steps S201-S203 in Embodiment 2, and thus will not be described in detail herein again.

In S402, a CRC is performed with a parity bit in the data frame, if the CRC passes, S404 is performed; otherwise, S403 is performed.

In the present embodiment, the frame structure of the data frame may be referred to the one illustrated in FIG. 2 of Embodiment 1, in which the last two bytes, $Byte_{n-1}$ and $Byte_n$ of the data frame of data to be transmitted can be used as CRC bits, which may be used to check the bit sequence of a received data frame, such that it may be tested or checked whether an error occurs in received data. If an error happens to the data reception, an NAK response message is fed back to the master device, so as to indicate a failure of data reception.

In S403, the NAK response message is fed back to the master device.

The way to feed the NAK response message back to the master device is the same as the way to feed the ACK response message back to the master device, except that the indicative information contained in the data to be sent indicates a data reception failure, rather than a data reception success. Specifically, the slave device is configured to control the level of the sending port to change according to waveform sequences corresponding to bits in the bit sequence of the data to be sent (NAK response message) and characteristics of the waveform sequences. The bit sequence of the data to be sent at least includes: data to be transmitted, and the data to be transmitted at least includes: a flag bit for at least indicating that the data to be transmitted is a response message for a failure of received data. The specific method of sending data may be referred to descriptions in S205 in Embodiment 2, and thus will not be described in detail herein again.

In S404, the $i^{th}$ data frame is stored into a FIFO data buffer and an ACK response message is fed back to the master device.

Specifically, the way to feed the ACK response message back to the master device is the same as the way to feed the NAK response message back as described in S403, except that the data to be transmitted at least include: a flag bit that at least indicating the data to be sent is a response message for a success of receiving data.

In S405, it is determined whether the $i^{th}$ data frame is the last frame, if yes, the data reception ends.

Specifically, it may be determined from whether the data frame includes at least 1-bit flag indicating that the current data frame is the last frame that if the $i^{th}$ data frame is the last frame, if yes, the current data frame is the last frame.

At this point, the slave device finishes receiving the N data frames sent by the master device.

Any procedure or method described in the flow charts or described in any other way herein may be understood to include one or more modules, portions or parts for storing executable codes that realize particular logic functions or procedures. Moreover, advantageous embodiments of the present disclosure includes other implementations in which the order of execution is different from that which is depicted or discussed, including executing functions in a substantially simultaneous manner or in an opposite order according to the related functions, which should be understood by those skilled in the art.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

What is claimed is:

1. A data transmission method, comprising:
acquiring data to be sent, the data to be sent comprising N data frames;
acquiring a bit sequence of an $i^{th}$ data frame, a value of i being 1, 2, 3 ... N sequentially, and N being a positive integer;
continuously sending X waveform sequences corresponding to bits in the bit sequence of the $i^{th}$ data frame according to the bit sequence of the $i^{th}$ data frame; wherein X is a positive integer, a waveform sequence comprises one of a first waveform sequence, a second waveform sequence and a third waveform sequence, and characteristics of the waveform sequences comprise that:
the first waveform sequence, the second waveform sequence and the third waveform sequence have an identical transmission duration, the transmission duration is inversely proportional to a baud rate of the waveform sequence, the first waveform sequence starts with a high level and has a low level presented within the transmission duration, in which a total duration of the low level presented in the first waveform sequence does not change with a change of the baud rate of the waveform sequence, the second waveform sequence maintains a high level within the transmission duration, the third waveform sequence starts with a low level and ends with a high level, in which a total duration of the low level presented in the third waveform sequence does not change with a change of the baud rate of the waveform sequence, and each waveform sequence of the X waveform sequences independently is one of the first waveform sequence, the second waveform sequence and the third waveform sequence;
detecting a level change of a receiving port after completion of sending the X waveform sequences corresponding to the bit sequence of the $i^{th}$ data frame;
determining Y waveform sequences of received data according to the level change and characteristics of the waveform sequences, Y being a positive integer, and each waveform sequence of the Y waveform sequences independently being one of the first waveform sequence, the second waveform sequence and the third waveform sequence;
determining a bit sequence of the received data according to the Y waveform sequences of the received data;
acquiring a bit sequence of an $(i+1)^{th}$ data frame when the bit sequence of the received data at least comprises a flag bit for at least indicating success of receiving data;

continuously sending Z waveform sequences corresponding to bits in the bit sequence of the $(i+1)^{th}$ data frame according to the bit sequence of the $(i+1)^{th}$ data frame until all the N data frames of the data to be sent are sent, Z being a positive integer, and each waveform sequence of the Z waveform sequences independently being one of the first waveform sequence, the second waveform sequence and the third waveform sequence;

wherein during sending the N data frames of the data to be sent, the first waveform sequence represents a first data bit being one of bit 1 or bit 0, and the second waveform sequence and the third waveform sequence represent a second data bit being the other one of bit 1 and bit 0, respectively; when at least two bits sent in a consecutive manner are the second data bits, a waveform sequence corresponding to a first bit of the at least two bits sent in a consecutive manner is the second waveform sequence, and waveform sequences corresponding to a second bit and subsequent bits are the third waveform sequences.

2. The method according to claim 1, wherein after the completion of sending the X waveform sequences corresponding to the bit sequence of the $i^{th}$ data frame, and before detecting the level change of the receiving port, the method further comprises:

performing a step of detecting the level change of the receiving port if the level change of the receiving port is detected within a preset time period; performing a step of continuously sending the X waveform sequences corresponding to the bits in the bit sequence of the $i^{th}$ data frame according to the bit sequence of the $i^{th}$ data frame again if no level change of the receiving port is detected within the preset time period.

3. The method according to claim 2, wherein after determining the bit sequence of the received data according to the Y waveform sequences of the received data, the method further comprises:

performing a step of continuously sending the X waveform sequences corresponding to the bits in the bit sequence of the $i^{th}$ data frame according to the bit sequence of the $i^{th}$ data frame again when the bit sequence of the received data comprises no flag bit for at least indicating success of receiving data.

4. The method according to claim 2, wherein continuously sending the X waveform sequences corresponding to the bits in the bit sequence of the $i^{th}$ data frame according to the bit sequence of the $i^{th}$ data frame comprises:

controlling a level of a sending port to change according to the X waveform sequences corresponding to the bits in the bit sequence of the $i^{th}$ data frame and characteristics of the waveform sequences, so as to send the $i^{th}$ data frame; and continuously sending the Z waveform sequences corresponding to the bits in the bit sequence of the $(i+1)^{th}$ data frame according to the bit sequence of the $(i+1)^{th}$ data frame comprises:

controlling the level of the sending port to change according to the Z waveform sequences corresponding to the bits in the bit sequence of the $(i+1)^{th}$ data frame and characteristics of the waveform sequences, so as to send the $(i+1)^{th}$ data frame.

5. The method according to claim 2, wherein the characteristics of the waveform sequences further comprise that:

the total duration of the low level presented in the first waveform sequence is less than half the transmission duration;

and/or the total duration of the low level presented in the third waveform sequence is less than half the transmission duration.

6. The method according to claim 2, wherein the characteristics of the waveform sequences further comprise that:

the third waveform sequence presents only one level jumping transition from a low level to a high level in the transmission duration;

the first waveform sequence starts with a high level, presents only one level jumping transition from a high level to a low level in the transmission duration and ends with a low level; or, the first waveform sequence starts with a high level, presents only one level jumping transition from a high level to a low level in the transmission duration and ends with a high level.

7. The method according to claim 1, wherein after determining the bit sequence of the received data according to the Y waveform sequences of the received data, the method further comprises:

performing a step of continuously sending the X waveform sequences corresponding to the bits in the bit sequence of the $i^{th}$ data frame according to the bit sequence of the $i^{th}$ data frame again when the bit sequence of the received data comprises no flag bit for at least indicating success of receiving data.

8. The method according to claim 1, wherein continuously sending the X waveform sequences corresponding to the bits in the bit sequence of the $i^{th}$ data frame according to the bit sequence of the $i^{th}$ data frame comprises:

controlling a level of a sending port to change according to the X waveform sequences corresponding to the bits in the bit sequence of the $i^{th}$ data frame and characteristics of the waveform sequences, so as to send the $i^{th}$ data frame; and continuously sending the Z waveform sequences corresponding to the bits in the bit sequence of the $(i+1)^{th}$ data frame according to the bit sequence of the $(i+1)^{th}$ data frame comprises:

controlling the level of the sending port to change according to the Z waveform sequences corresponding to the bits in the bit sequence of the $(i+1)^{th}$ data frame and characteristics of the waveform sequences, so as to send the $(i+1)^{th}$ data frame.

9. The method according to claim 1, wherein the characteristics of the waveform sequences further comprise that:

the total duration of the low level presented in the first waveform sequence is less than half the transmission duration;

and/or the total duration of the low level presented in the third waveform sequence is less than half the transmission duration.

10. The method according to claim 1, wherein the characteristics of the waveform sequences further comprise that:

the third waveform sequence presents only one level jumping transition from a low level to a high level in the transmission duration;

the first waveform sequence starts with a high level, presents only one level jumping transition from a high level to a low level in the transmission duration and ends with a low level; or, the first waveform sequence starts with a high level, presents only one level jumping transition from a high level to a low level in the transmission duration and ends with a high level.

11. A terminal, comprising:
a processor,
a memory,
one or more modules stored in the memory and executable by the processor, and comprising:
a bit sequence acquiring module, a waveform sequence generating and sending module, a level detecting module and a data determining module, wherein:
the bit sequence acquiring module is configured to acquire data to be sent, the data to be sent comprising N data frames; to acquire a bit sequence of an $i^{th}$ data frame, a value of i being 1, 2, 3 ... N sequentially, and N being a positive integer;
the waveform sequence generating and sending module is configured to continuously send X waveform sequences corresponding to bits in the bit sequence of the $i^{th}$ data frame according to the bit sequence of the $i^{th}$ data frame, wherein X is a positive integer, a waveform sequence comprises one of a first waveform sequence, a second waveform sequence and a third waveform sequence, and characteristics of the waveform sequences comprise that:
the first waveform sequence, the second waveform sequence and the third waveform sequence have an identical transmission duration, the first waveform sequence starts with a high level and has a low level presented within the transmission duration, in which a total duration of the low level presented in the first waveform sequence does not change with a change of the baud rate of the waveform sequence, the second waveform sequence maintains a high level within the transmission duration, the third waveform sequence starts with a low level and ends with a high level, in which a total duration of the low level presented in the third waveform sequence does not change with a change of the baud rate of the waveform sequence, and each waveform sequence of the X waveform sequences independently is one of the first waveform sequence, the second waveform sequence and the third waveform sequence;
the level detecting module is configured to detect a level change of a receiving port after the X waveform sequences corresponding to the bit sequence of the $i^{th}$ data frame are sent completely by the waveform sequence generating and sending module;
the data determining module is configured to determine Y waveform sequences of received data according to the level change and characteristics of the waveform sequences, Y being a positive integer, and each waveform sequence of the Y waveform sequences independently being one of the first waveform sequence, the second waveform sequence and the third waveform sequence; to determine a bit sequence of the received data according to the Y waveform sequences of the received data; and trigger the bit sequence acquiring module to acquire a bit sequence of an $(i+1)^{th}$ data frame when the bit sequence of the received data at least comprises a flag bit for at least indicating success of receiving data;
the bit sequence acquiring module is further configured to acquire the bit sequence of the $(i+1)^{th}$ data frame when being triggered by the data determining module;
the waveform sequence generating and sending module is further configured to continuously send Z waveform sequences corresponding to bits in the bit sequence of the $(i+1)^{th}$ data frame according to the bit sequence of the $(i+1)^{th}$ data frame until all the N data frames of the data to be sent are sent, Z being a positive integer, and each waveform sequence of the Z waveform sequences independently being one of the first waveform sequence, the second waveform sequence and the third waveform sequence;
wherein, when the N data frames of the data to be sent are sent by the waveform sequence generating and sending module, the first waveform sequence represents a first data bit being one of bit 1 or bit 0, and the second waveform sequence and the third waveform sequence represent a second data bit being the other one of bit 1 and bit 0, respectively; when at least two bits sent in a consecutive manner are the second data bits, a waveform sequence corresponding to a first bit of the at least two bits sent in a consecutive manner is the second waveform sequence, and waveform sequences corresponding to a second bit and subsequent bits are the third waveform sequences.

12. The terminal according to claim 11, wherein,
the level detecting module is further configured to perform a step of detecting the level change of the receiving port if the level change of the receiving port is detected within a preset time period; trigger the waveform sequence generating and sending module to perform a step of continuously sending the X waveform sequences corresponding to the bits in the bit sequence of the $i^{th}$ data frame according to the bit sequence of the $i^{th}$ data frame again if no level change of the receiving port is detected within the preset time period;
the waveform sequence generating and sending module is further configured to continuously send the X waveform sequences corresponding to the bits in the bit sequence of the $i^{th}$ data frame according to the bit sequence of the $i^{th}$ data frame again when being triggered by the level detecting module.

13. The terminal according to claim 11, wherein,
the data determining module is further configured to trigger the waveform sequence generating and sending module to resend the X waveform sequences corresponding to the bit sequence of the $i^{th}$ data frame when the bit sequence of the received data does not comprise the flag bit for at least indicating success of receiving data;
the waveform sequence generating and sending module is further configured to continuously send the X waveform sequences corresponding to the bits in the bit sequence of the $i^{th}$ data frame according to the bit sequence of the $i^{th}$ data frame again when the bit sequence of the received data does not comprise the flag bit for at least indicating success of receiving data.

14. The terminal according to claim 11, wherein,
the waveform sequence generating and sending module is configured to continuously send the X waveform sequences corresponding to the bits in the bit sequence of the $i^{th}$ data frame according to the bit sequence of the $i^{th}$ data frame in such a way that:
the waveform sequence generating and sending module is further configured to control a level of a sending port to change according to the X waveform sequences corresponding to the bits in the bit sequence of the $i^{th}$ data frame and characteristics of the waveform sequences, so as to send the $i^{th}$ data frame;
the waveform sequence generating and sending module continuously is configured to continuously send the Z waveform sequences corresponding to the bits in the bit sequence of the $(i+1)^{th}$ data frame according to the bit sequence of the $(i+1)^{th}$ data frame in such a way that:

the waveform sequence generating and sending module is further configured to control the level of the sending port to change according to the Z waveform sequences corresponding to the bits in the bit sequence of the $(i+1)^{th}$ data frame and characteristics of the waveform sequences, so as to send the $(i+1)^{th}$ data frame.

15. The terminal according to claim 11, wherein,
the characteristics of the waveform sequences further comprise that:
the total duration of the low level presented in the first waveform sequence is less than half the transmission duration;
and/or
the total duration of the low level presented in the third waveform sequence is less than half the transmission duration.

16. The terminal according to claim 11, wherein,
the characteristics of the waveform sequences further comprise that:
the third waveform sequence presents only one level jumping transition from a low level to a high level in the transmission duration;
the first waveform sequence starts with a high level, presents only one level jumping transition from a high level to a low level in the transmission duration and ends with a low level; or, the first waveform sequence starts with a high level, presents only one level jumping transition from a high level to a low level in the transmission duration and ends with a high level.

17. A data transmission method, comprising:
detecting a level change of a receiving port;
determining waveform sequences transmitted in a consecutive manner according to the level change and characteristics of the waveform sequences, wherein a waveform sequence comprises one of a first waveform sequence, a second waveform sequence and a third waveform sequence, and characteristics of the waveform sequences comprise that:
the first waveform sequence, the second waveform sequence and the third waveform sequence have an identical transmission duration, the transmission duration is inversely proportional to a baud rate of the waveform sequence, the first waveform sequence starts with a high level and has a low level presented within the transmission duration, in which a total duration of the low level presented in the first waveform sequence does not change with a change of the baud rate of the waveform sequence, the second waveform sequence maintains a high level within the transmission duration, the third waveform sequence starts with a low level and ends with a high level, in which a total duration of the low level presented in the third waveform sequence does not change with a change of the baud rate of the waveform sequence, and each waveform sequence in the waveform sequences transmitted in a consecutive manner independently is one of the first waveform sequence, the second waveform sequence and the third waveform sequence;
determining a bit sequence of a received data frame according to the waveform sequences transmitted in a consecutive manner, wherein, the first waveform sequence represents a first data bit being one of bit 1 or bit 0, and the second waveform sequence and the third waveform sequence represent a second data bit being the other one of bit 1 and bit 0, respectively;
after identifying X waveform sequences corresponding to an end of frame of the received data frame from the waveform sequences transmitted in a consecutive manner, verifying the bit sequence of the received data frame with a parity bit of transmitted data in the received data frame, if the verification is accomplished, acquiring a bit sequence of data to be sent, X being a positive integer, the bit sequence of the data to be sent at least comprising: data to be transmitted, and the data to be transmitted at least comprising: a flag bit for at least indicating the data to be sent being a response message for success of receiving data;
controlling a level of a sending port to change according to the waveform sequences corresponding to bits in the bit sequence of the data to be sent and characteristics of the waveform sequences, so as to send the bit sequence of the data to be sent; in which when at least two bits sent in a consecutive manner are the second data bits, a waveform sequence corresponding to a first bit of the at least two bits sent in a consecutive manner is the second waveform sequence, and waveform sequences corresponding to a second bit and subsequent bits are the third waveform sequences.

18. The method according to claim 17, wherein,
the bit sequence of the received data frame sequentially comprises: a start of frame, the transmission data and the end of frame;
the end of frame comprises two bits, wherein:
a waveform sequence corresponding to a first bit of the end of frame is the second waveform sequence and a waveform sequence corresponding to a second bit of the end of frame is the second waveform sequence, or,
the waveform sequence corresponding to the first bit of the end of frame is the third waveform sequence and the waveform sequence corresponding to the second bit of the end of frame is the second waveform sequence, or,
the waveform sequence corresponding to the first bit of the end of frame is the first waveform sequence and the waveform sequence corresponding to the second bit of the end of frame is the third waveform sequence.

19. The method according to claim 17, wherein,
the characteristics of the waveform sequences further comprise that:
the total duration of the low level presented in the first waveform sequence is less than half the transmission duration;
and/or
the total duration of the low level presented in the third waveform sequence is less than half the transmission duration.

20. The method according to claim 17, wherein,
the characteristics of the waveform sequences further comprise that:
the third waveform sequence presents only one level jumping transition from a low level to a high level in the transmission duration;
the first waveform sequence starts with a high level, presents only one level jumping transition from a high level to a low level in the transmission duration and ends with a low level; or, the first waveform sequence starts with a high level, presents only one level jumping transition from a high level to a low level in the transmission duration and ends with a high level.

* * * * *